(12) United States Patent
Kawamura

(10) Patent No.: US 10,261,273 B2
(45) Date of Patent: Apr. 16, 2019

(54) BI-DIRECTIONAL OPTICAL MODULE COMMUNICATING WITH SINGLE OPTICAL FIBER AND OPTICAL TRANSCEIVER IMPLEMENTING THE SAME

(71) Applicant: SUMITOMO ELECTRIC INDUSTRIES, LTD., Osaka (JP)

(72) Inventor: Masanobu Kawamura, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 205 days.

(21) Appl. No.: 15/048,660

(22) Filed: Feb. 19, 2016

(65) Prior Publication Data

US 2016/0252690 A1 Sep. 1, 2016

Related U.S. Application Data

(60) Provisional application No. 62/121,339, filed on Feb. 26, 2015.

(51) Int. Cl.
*G02B 6/42* (2006.01)
*G02B 6/293* (2006.01)

(52) U.S. Cl.
CPC .......... *G02B 6/4246* (2013.01); *G02B 6/421* (2013.01); *G02B 6/4214* (2013.01); *G02B 6/29361* (2013.01); *G02B 6/428* (2013.01); *G02B 6/4243* (2013.01); *G02B 6/4286* (2013.01); *G02B 6/4292* (2013.01)

(58) Field of Classification Search
CPC .. G02B 6/4215; G02B 6/2938; G02B 6/4246; G02B 6/32; G02B 6/3839; G02B 6/4204; G02B 6/29368; G02B 6/327; H04B 10/40; H04B 10/506
See application file for complete search history.

(56) References Cited

U.S. PATENT DOCUMENTS

| | | | | |
|---|---|---|---|---|
| 5,671,315 A * | 9/1997 | Tabuchi | ............... | G02B 6/4208 385/137 |
| 5,737,104 A * | 4/1998 | Lee | ..................... | G02B 6/29362 385/24 |
| 5,808,763 A * | 9/1998 | Duck | ................. | G02B 6/29362 398/79 |
| 6,008,920 A * | 12/1999 | Hendrix | ............... | G02B 6/2938 359/633 |
| 6,198,864 B1 * | 3/2001 | Lemoff | .............. | G02B 6/29367 385/24 |

(Continued)

*Primary Examiner* — David C Payne
*Assistant Examiner* — Tanya T Motsinger
(74) *Attorney, Agent, or Firm* — Smith, Gambrell & Russell, LLP.

(57) ABSTRACT

An optical module to receive Rx-light from a single optical fiber and to transmit Tx-light to the single optical fiber is disclosed. In the optical module, the Rx-light enters a photodiode (PD) via a shortest path within a coupling block that provides surfaces constituting the path. The Tx-light emitted from a laser diode (LD) travels around a WDM filter within the coupling block. Both the Rx-light and the Tx-light enter the WDM filter at an acute angle. The lens to concentrate the Rx-light on the PD and to collimate the Tx-light is precisely aligned with respective devices mounted on a printed circuit board (PCB).

20 Claims, 19 Drawing Sheets

(56) References Cited

U.S. PATENT DOCUMENTS

| | | | | |
|---|---|---|---|---|
| 6,292,298 B1* | 9/2001 | Glance | | G02B 6/29358 359/583 |
| 6,374,021 B1* | 4/2002 | Nakanishi | | G02B 6/4246 385/49 |
| 6,433,911 B1* | 8/2002 | Chen | | G02B 6/29307 359/199.4 |
| 6,445,857 B1* | 9/2002 | Korenaga | | G02B 6/12007 385/129 |
| 6,477,190 B1* | 11/2002 | Komiyama | | H01S 5/02248 372/29.01 |
| 6,888,988 B2 | 5/2005 | Vancoille et al. | | |
| 8,540,437 B2* | 9/2013 | Lee | | G02B 6/4215 385/31 |
| 9,818,893 B2* | 11/2017 | Wang | | H01L 31/0236 |
| 2003/0095744 A1* | 5/2003 | Takano | | G02B 6/12007 385/24 |
| 2004/0071407 A1* | 4/2004 | Vergeest | | G02B 6/3809 385/58 |
| 2004/0101006 A1* | 5/2004 | Iwafuji | | H01S 5/02252 372/36 |
| 2004/0101247 A1* | 5/2004 | Chen | | G02B 6/29367 385/47 |
| 2005/0128591 A1* | 6/2005 | Shiozaki | | G02B 5/1814 359/566 |
| 2006/0013541 A1* | 1/2006 | Plickert | | G02B 6/4246 385/89 |
| 2006/0088255 A1* | 4/2006 | Wu | | G02B 6/2938 385/92 |
| 2008/0049798 A1* | 2/2008 | Satou | | H01S 5/0687 372/32 |
| 2008/0175591 A1* | 7/2008 | Yu | | G02B 6/2706 398/65 |
| 2009/0097847 A1* | 4/2009 | Hosomi | | G02B 6/29367 398/43 |
| 2010/0246621 A1* | 9/2010 | Kuzukami | | H01S 5/024 372/38.02 |
| 2011/0013869 A1* | 1/2011 | Pezeshki | | G02B 6/32 385/33 |
| 2012/0148192 A1* | 6/2012 | Nakanishi | | G02B 6/4206 385/33 |
| 2012/0219256 A1 | 8/2012 | McColloch et al. | | |
| 2013/0084070 A1* | 4/2013 | Ho | | G02B 6/4204 398/68 |
| 2015/0037038 A1* | 2/2015 | Takahashi | | H04B 10/40 398/79 |
| 2015/0311995 A1* | 10/2015 | Wang | | G02B 6/2938 398/49 |
| 2015/0346433 A1* | 12/2015 | Tamura | | H04B 10/506 398/82 |
| 2016/0191192 A1* | 6/2016 | Yue | | G02B 6/2938 398/83 |
| 2016/0195677 A1* | 7/2016 | Panotopoulos | | G02B 6/4214 250/227.23 |
| 2016/0231581 A1* | 8/2016 | Liu | | G02B 27/283 |
| 2017/0117981 A1* | 4/2017 | Li | | H04J 14/0212 |
| 2017/0194522 A1* | 7/2017 | Wang | | H01L 31/035281 |

\* cited by examiner

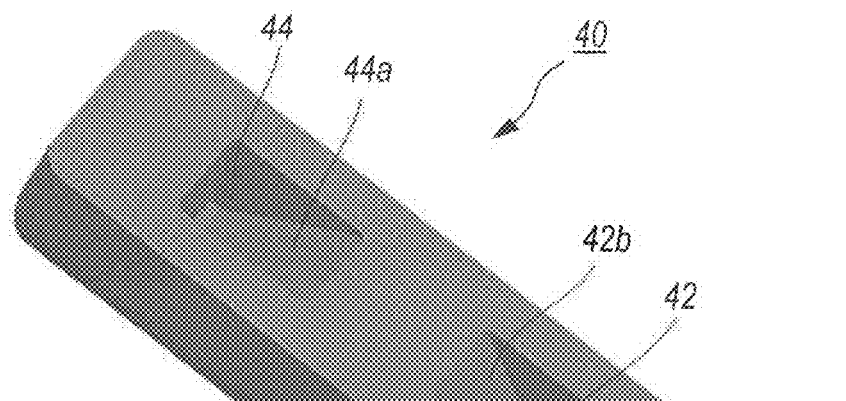
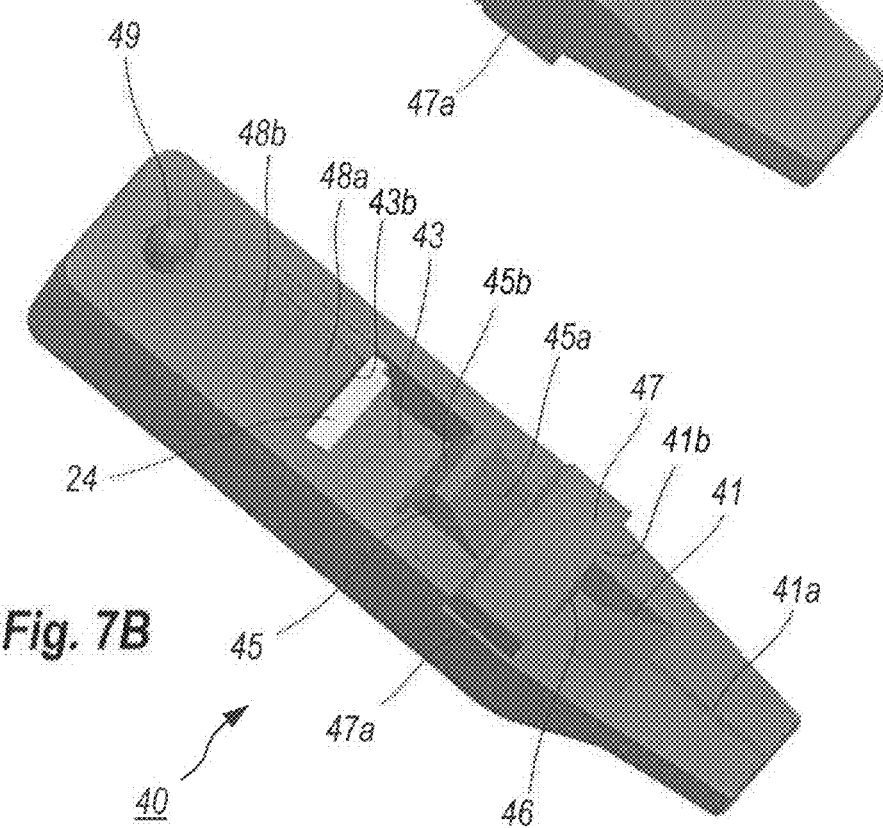

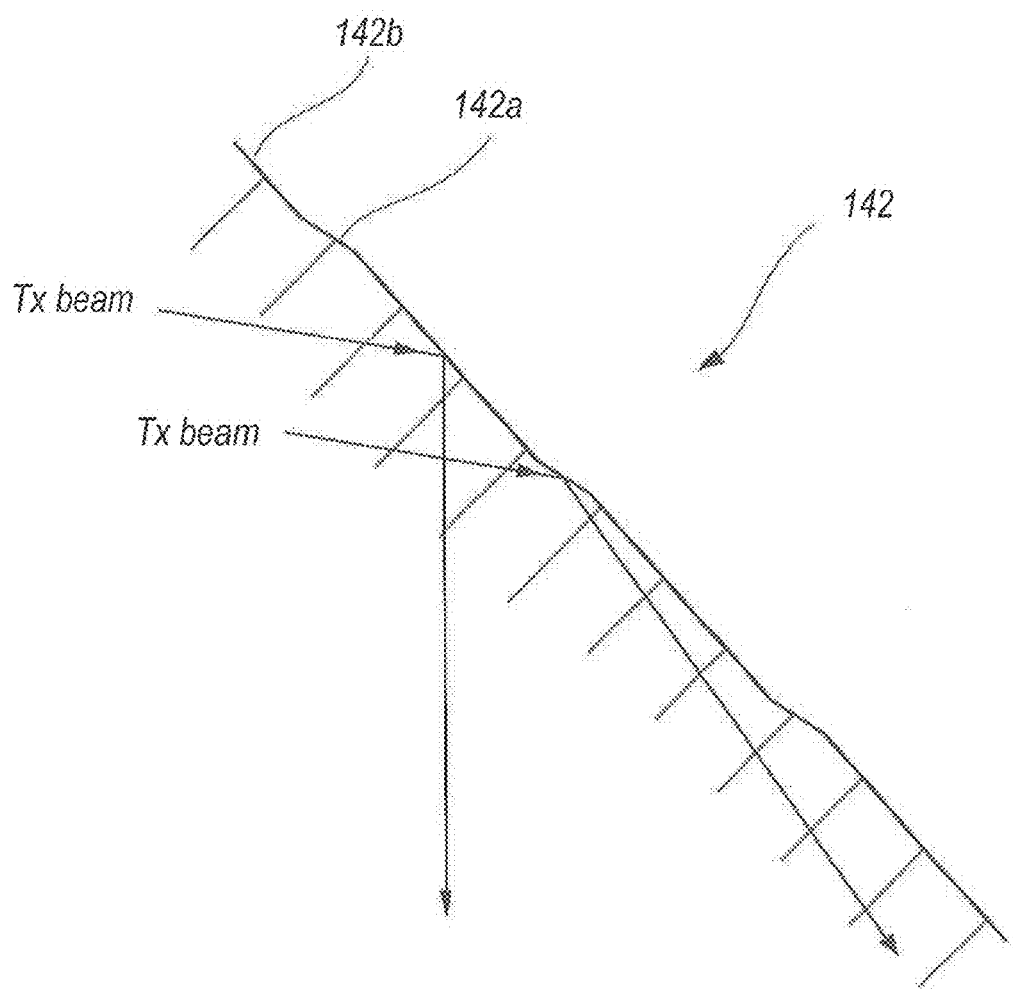

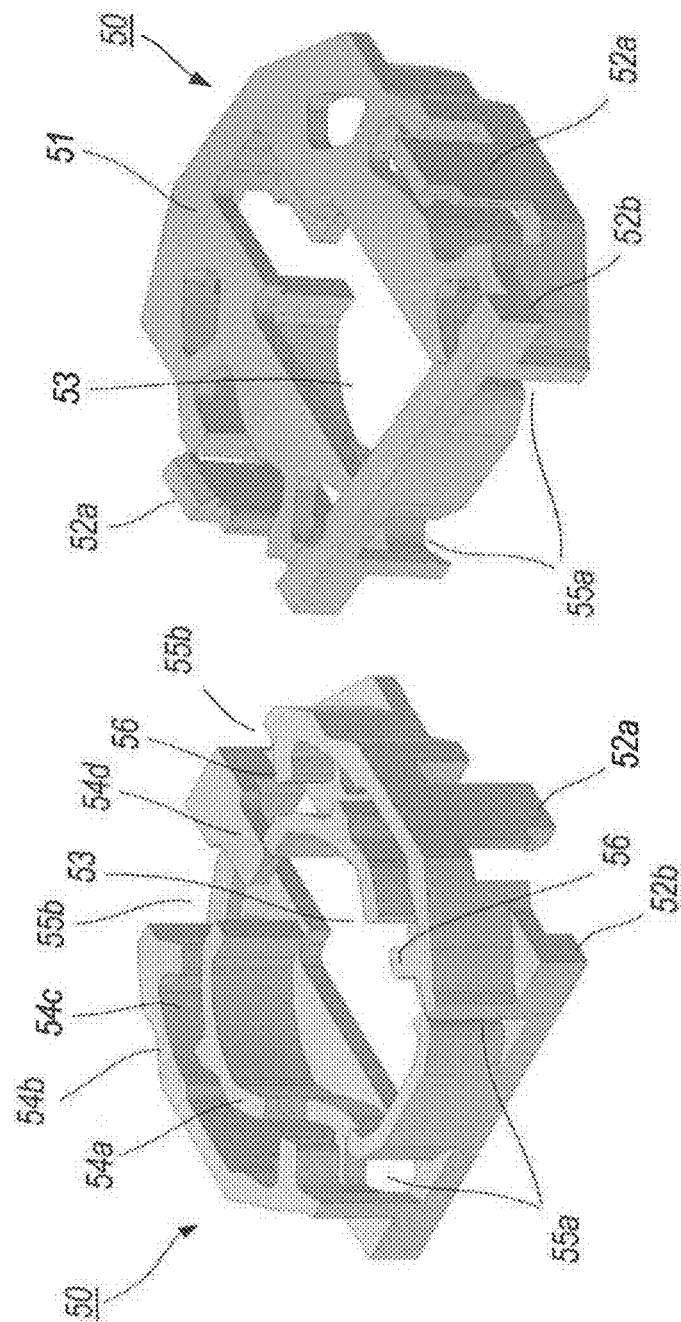

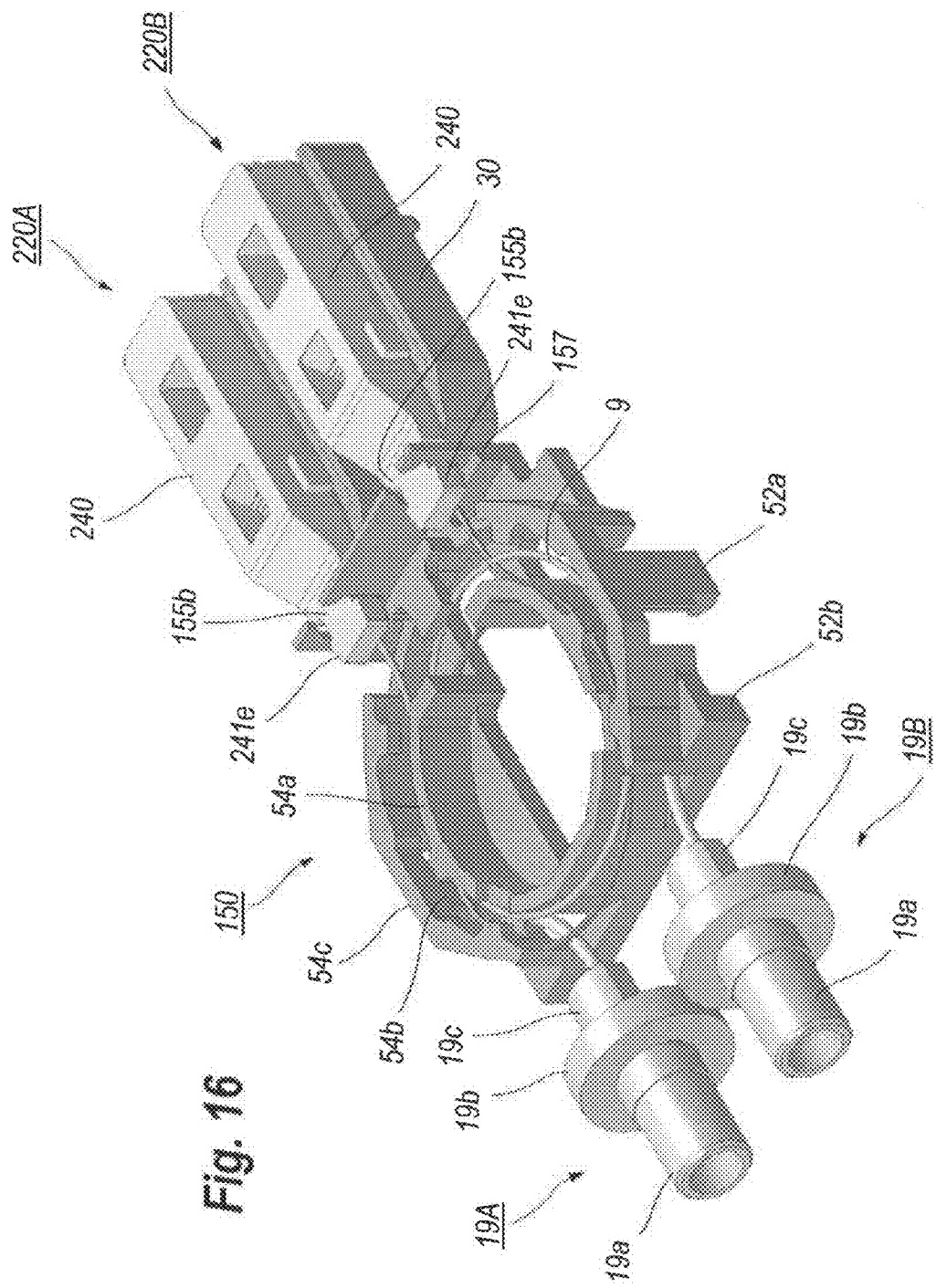

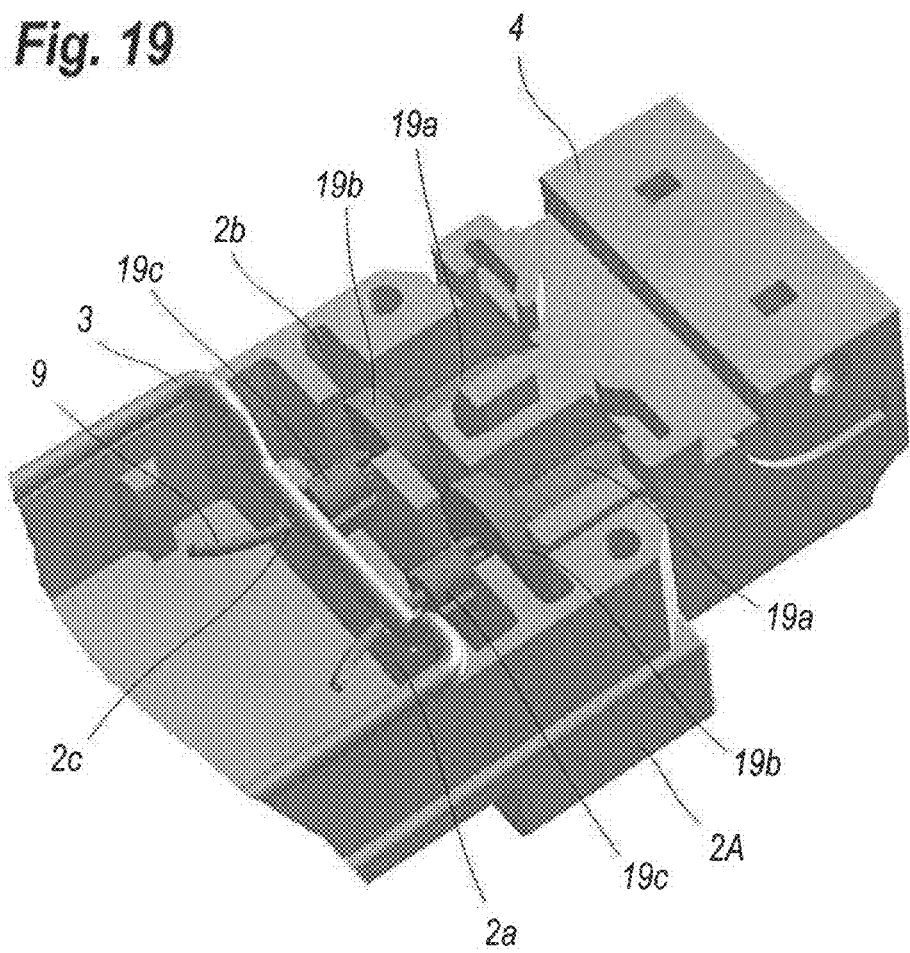

BI-DIRECTIONAL OPTICAL MODULE COMMUNICATING WITH SINGLE OPTICAL FIBER AND OPTICAL TRANSCEIVER IMPLEMENTING THE SAME

CROSS REFERENCE TO RELATED APPLICATION

This application claims the benefit of U.S. Provisional patent application Ser. No. 62/121,339 filed Feb. 26, 2015 and entitled "BI-DIRECTIONAL OPTICAL MODULE COMMUNICATING WITH SINGLE OPTICAL FIBER."

BACKGROUND OF THE INVENTION

Field of the Invention

The present invention relates to an optical module, in particular, the invention relates to the bi-directional optical module that transmits transmitting light to a single optical fiber and receives receiving light from the single optical fiber; and an optical transceiver implementing the optical module.

Related Background Art

When a transmitting optical beam and a receiving optical beam each propagate in an optical fiber, a wavelength division multiplexing (WDM) filter is used to divide the transmitting optical beam from the receiving optical beam. One type of the WDM filters stacks, on a substrate, a plurality of optical films having thicknesses equivalent to a quarter wavelength ($\lambda/4$) of the optical beam. The number of films determines the performance of the optical discrimination between the transmitting optical beam and the receiving optical beam, namely, the cut-off performance of the WDM filter. The sharp cut-off performance requests the number of stacking of the films.

An angle, by which the transmitting optical beam and/or the receiving optical beam enter the WDM filter, also determines the cut-off performance. As the incident angle of the optical beam becomes large, that is, as the incident angle deviates from the normal angle, the designed cut-off performance of the WDM filter becomes hard to be realized. Setting the incident angle close to the normal of the WDM filter, the designed cut-off performance may be obtained even the WDM filter decreases the number of the stacking of the films.

Various prior documents have disclosed a bi-directional optical module that optically couples with a single optical fiber. One of the documents has disclosed that a transmitter module and a receiver module each have a co-axial housing assembled with a housing that installs the WDM filter. The WDM filter makes an angle of 45° with respect to the optical axis of the transmitter module and that of the receiver module. Other documents also have disclosed optical modules including a lens module that covers a transmitter device and a receiver device, and divides the transmitting optical beam from the receiving optical beam within the lens module. However, the incident angle of the transmitting optical beam and/or the receiving optical beam with respect to the WDM filter in those prior documents has been set to be 45° same as those of the first prior document. Some prior documents have disclosed, in the arrangement of the lens module, that the incident angle with respect to the WDM filter is set to be an acute angle, but left various subjects including the crosstalk between the transmitting optical beam and the receiving optical beam.

SUMMARY OF THE INVENTION

An aspect of the present application relates to a bi-directional optical module. The bi-directional optical module is mounted on a circuit board and optically couples a semiconductor laser diode (LD) and a semiconductor photodiode (PD) each also mounted on the circuit board with an inner fiber secured in the bi-directional optical module. The inner fiber transmits a transmitting optical beam output from the LD and a receiving optical beans provided to the PD. The bi-directional optical module comprises a base, a lens, a coupling block, and a wavelength division multiplexing (WDM) filter. The base is mounted on the circuit board. The lens is mounted on the base and includes a first lens element and a second lens element. The coupling block is mounted on the base and optically couples the transmitting optical beam output from the LD through the first lens element with the inner fiber, and the receiving optical beam output from the inner fiber with the PD through the second lens element. The WDM filter is secured in the coupling block. A feature of the bi-directional optical module of the present application is that the receiving optical beam provided from the inner fiber enters the WDM filter by an incident angle less than 20°, and the transmitting optical beam output from the LD enters the WDM filter by an angle substantially same with the incident angle.

Another aspect of the present application relates to a pluggable optical transceiver that is plugged in a host apparatus. The optical transceiver comprises an optical receptacle, a bi-directional optical module, a circuit board, and an inner fiber. The optical receptacle receives an external fiber including an optical port. The bi-directional optical module provides a semiconductor laser diode (LD) and a semiconductor photodiode (PD). The LD outputs a transmitting optical beam to the external fiber, while, the PD receives a receiving optical beam provided from the external optical fiber. The circuit board provides a plug electrically communicating with the host apparatus and mounts the optical module thereon. The inner fiber optically couples the optical port in the optical receptacle with the optical module mounted on the circuit board. In the optical transceiver of the present application, the bi-directional optical module includes a base mounted on the circuit board, a lens mounted on the base, the coupling block mounted on the base, and a wavelength division multiplexing (WDM) filter secured in the coupling block. The lens includes a first lens element and a second lens element. The coupling block optically couples the transmitting optical beam output from the LD through the first lens element with the inner fiber and also optically couples the receiving optical beam provided from the external fiber through the inner fiber with the PD through the second lens element. A feature of the optical transceiver of the present application is that the receiving optical beam provided from the inner fiber enters the WDM filter by an incident angle less than or equal to 10°, and the transmitting optical beam output from the LD enters the WDM filter by an angle substantially same with the incident angle.

BRIEF DESCRIPTION OF THE DRAWINGS

The invention may be more completely understood in consideration of the following detailed description of various embodiments of the invention in connection with the accompanying drawings, in which:

FIG. 7A is a perspective view of the top of the coupling block of the optical module according to the first embodiment of the present invention, and FIG. 7B is a perspective view of the bottom of the coupling block;

FIG. 11 magnifies the rear wall of the second pocket that provides two surfaces having angles different from each other with respect to the primary surface of the circuit board;

FIG. 14A shows a top of the fiber bobbin and FIG. 14B shows a bottom of the fiber bobbin;

FIG. 16 shows an intermediate assembly including the optical modules, the fiber bobbin shown in FIG. 15A, and the optical ports;

FIG. 19 shows the optical ports set in the top housing as inserting the flanges into the pocket of the top housing.

DETAILED DESCRIPTION OF EMBODIMENTS

Next, some embodiments of the present invention will be described as referring to drawings. In the description of the drawings, numerals or symbols same with or similar to each other will refer to elements same with or similar to each other without duplicated explanations.

First Embodiment

Figure 1:
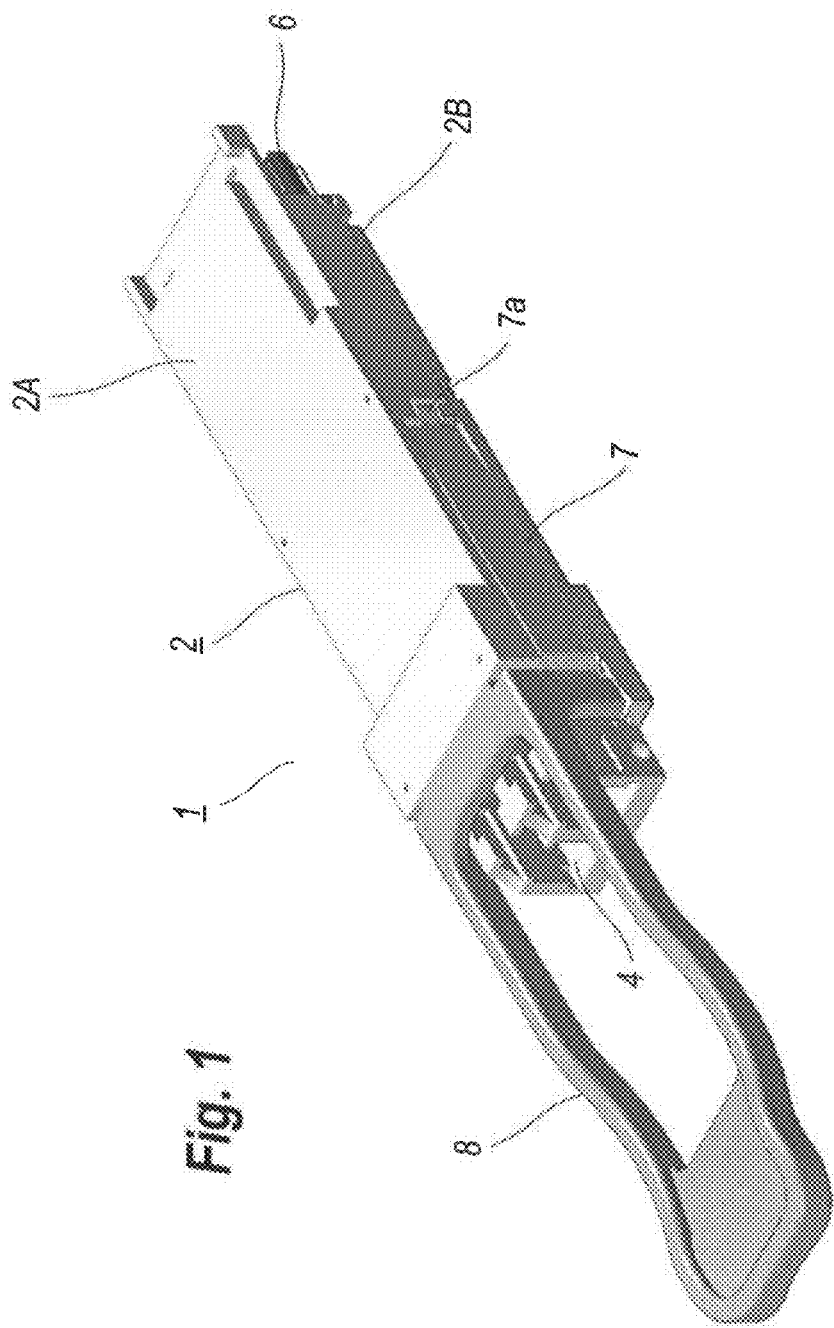
FIG. 1 shows an outer appearance of an optical transceiver according to an embodiment of the present application.

FIG. 1 shows an outer appearance of an optical transceiver 1 according to an embodiment of the present application. The optical transceiver 1 shown in FIG. 1 is a type of the pluggable optical transceiver that is to be plugged in a cage system prepared in a host apparatus and follows the standard of, what is called, the quadrature small form factor pluggable (QSFP) which is one of multi-source agreements (MSA) ruled in the field of the optical communication apparatus. The optical transceiver 1 provides a housing constituted by a top housing 2A and a bottom housing 2B. A space is formed between the top and bottom housings, 2A and 2B, to enclose optical and electrical components therein. Both sides of the housing 2 provide sliders 7 that are movable longitudinally of the housing 2 working together with a pull of the pull-tab 8. Pulling the pull-tab 8 frontward when the optical transceiver 1 is set in the cage system of the host apparatus, projections 7a formed in respective ends of the arms 7 release the engagement between the optical transceiver 1 and the cage system, and the optical transceiver 1 may be extracted from the cage system. The housing 2 provides in the front thereof a pair of optical ports, or optical receptacles that receive optical connectors secured in the end of the external fiber. Also, the housing 2 provides an electrical plug 6 in the rear thereof, through which the optical transceiver 1 may communicate with the host apparatus. In the description below, a direction of "front" or "forward" corresponds to the side where the optical receptacle 4 is formed, while, another direction of "rear" or "back" corresponds to the side the electrical plug 6 is provided. However, these notations of the directions are only for the explanation sake and may not affect the scope of the present invention.

Figure 2:
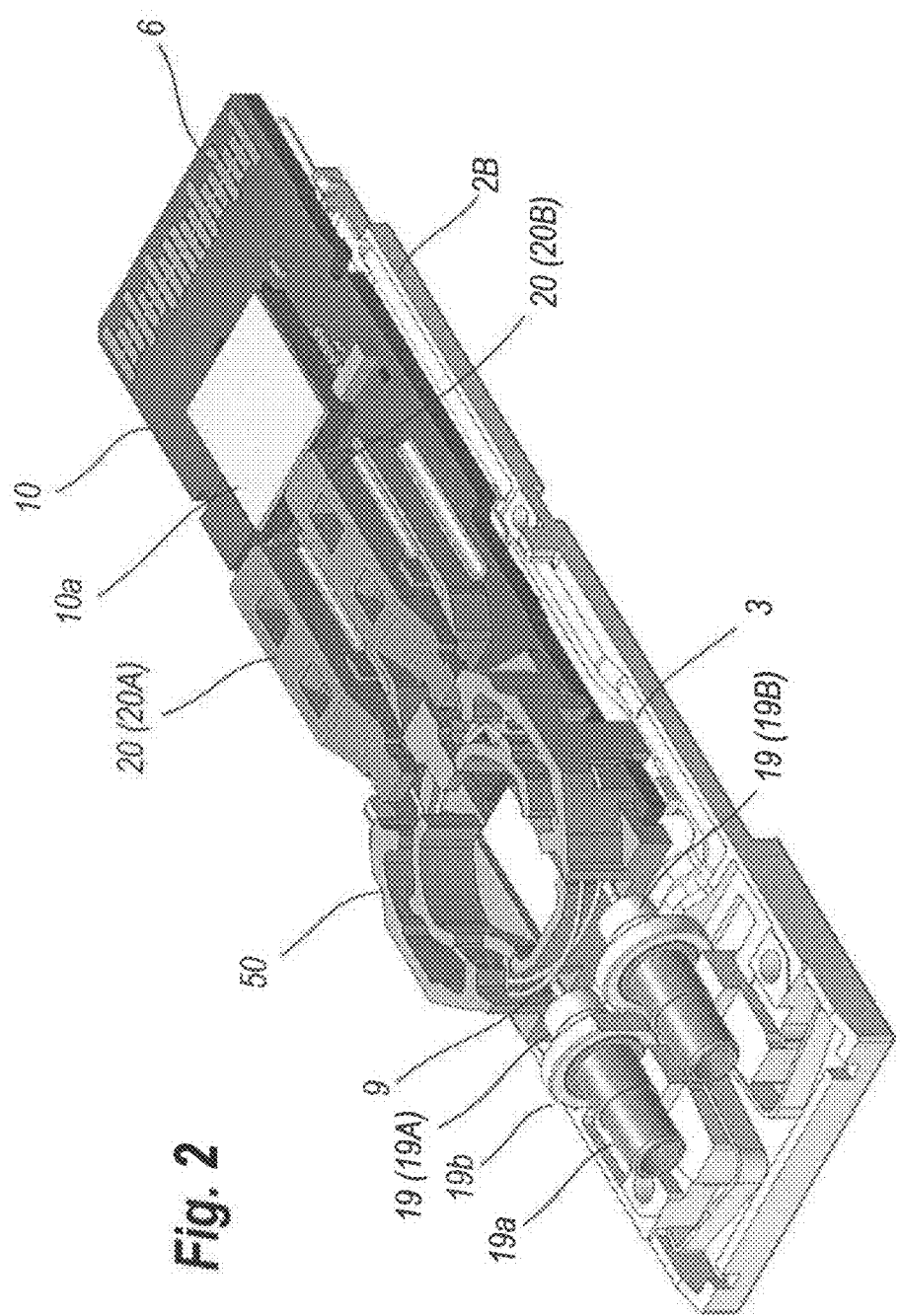
FIG. 2 shows an inside of the optical transceiver by removing the top housing thereof.

FIG. 2 shows an inside of the optical transceiver 1 by removing the top housing 2A. The optical transceiver 1 encloses in the space between two housings, 2A and 2B, two optical ports 19 (19A and 19B), a fiber bobbin 50, two optical modules 20 (20A and 20B), and a circuit board 10. The circuit board 10 mounts the fiber bobbin 50, two optical modules 20, and some electronic circuits 10a thereof. Also, the circuit board 10 forms the electrical plug 6 in the rear end thereof. Two optical modules 20 are optically coupled with respective optical ports 19 through inner fibers 9 that are wound in the fiber bobbin 50. Details of the optical modules 20 and the fiber bobbin 50 will be described in later of the specification.

The optical ports 19 each include a sleeve 19a and a flange 19b. Although not depicted in FIG. 2, the sleeve 19a protrudes into the optical receptacle 4 to receive an optical ferrule, which is attached in an end of the external fiber and secured within an optical connected set in the optical receptacle 4. Thus, the external fiber may optically couple with the optical module 20, exactly; semiconductor optical devices mounted on the circuit board 10 through the optical module 20 and the inner fiber 9. The optical ports 19 in the flange 19b thereof may be supported between the top and bottom housings, 2A and 2B, to form the optical receptacle 4 whose physical dimensions follow the standard of the LC connector. The bottom housing 2B also provides grooves in peripheries thereof, where the grooves set gaskets therein. The gasket in the grooves may effectively shield the space between two housings, 2A and 2B, by being crushed between two housings, 2A and 2B.

Figure 3:
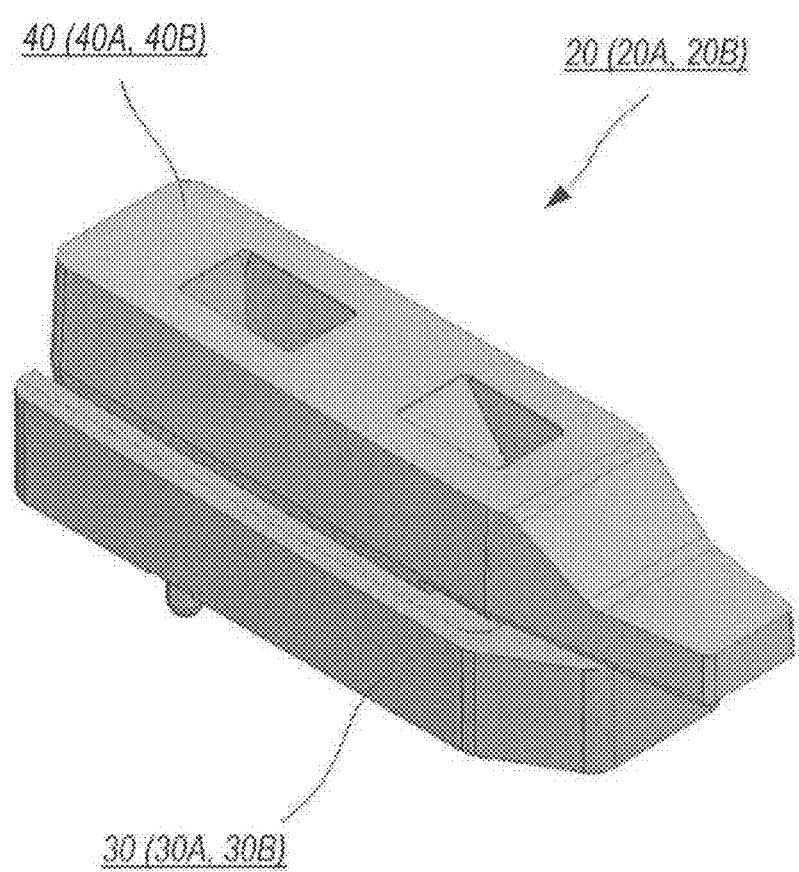
FIG. 3 is an outer appearance of an optical module according to an embodiment of the present invention.
Figure 4:
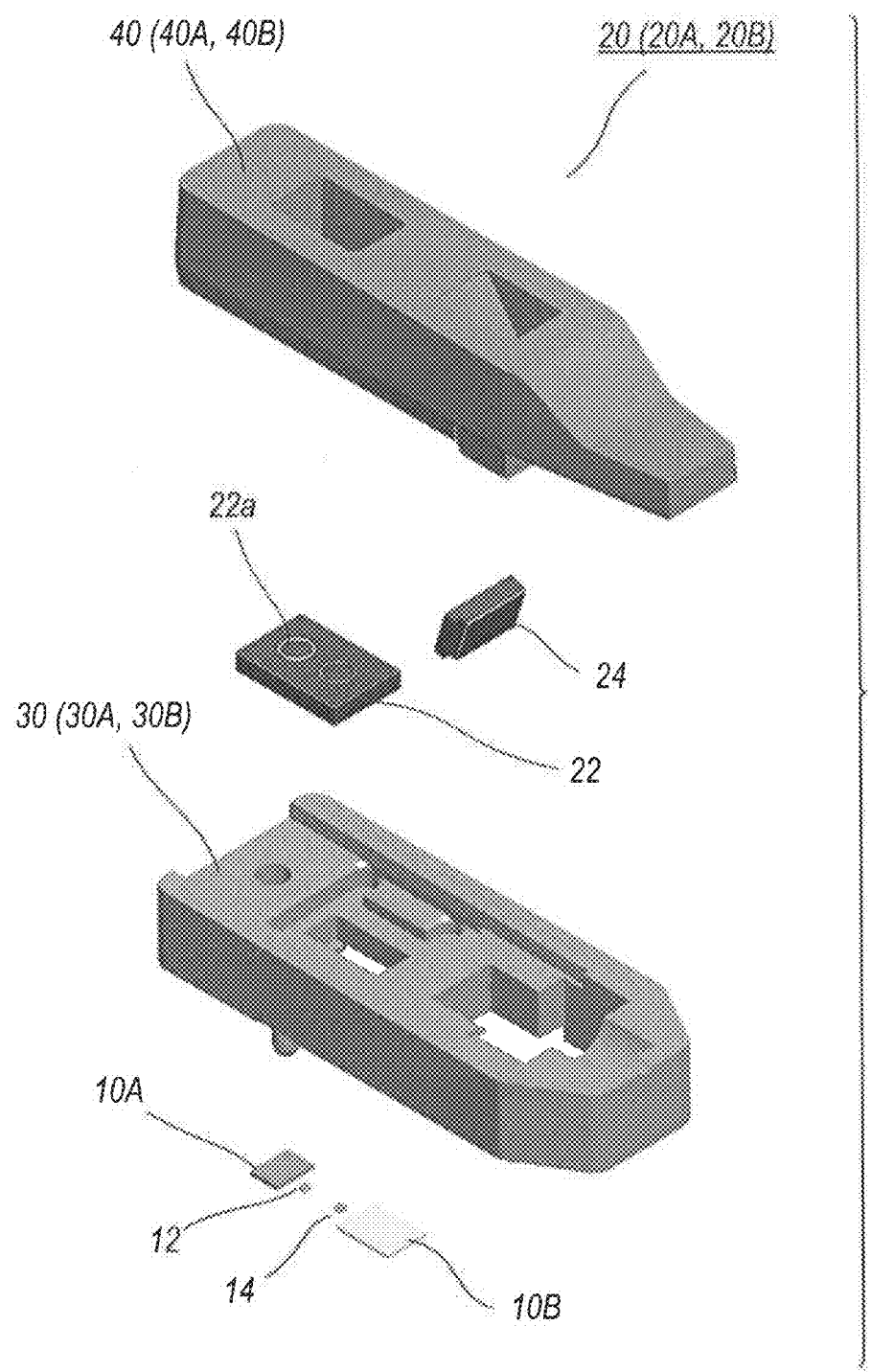
FIG. 4 is an exploded view of the optical module shown in FIG. 3.

FIG. 3 magnifies the optical module 20 according to an embodiment of the present invention, and FIG. 4 is an exploded view of the optical module shown in FIG. 3. In FIG. 3, the inner fiber 9 coupled with the optical module 20 and the circuit board 10 that mounts the optical module 20 is omitted. The optical module 20 of the present embodiment primarily comprises a frame 30 and a coupling block 40, where the frame 30 mounts the coupling block 40 thereon. The frame 30 and the coupling block 40 are preferably made of resin. Specifically, the coupling block 40 may be made of resin substantially transparent for optical beams subject to the optical module 20; while, the frame 30 is preferably made of liquid crystal polymer (LCP).

In a conventional optical module, in particular, the transmission speed thereof is 10 Gbps at most, a photodiode (PD) used therein has an optical sensing area with a diameter of about 70 to 100 µm. For such a PD, the alignment accuracy of a lens that concentrates an optical beam onto the sensing area of the PD is about 10 µm in a plane perpendicular to the optical axis of the PD or the lens, and about 30 µm in a distance between the lens and the PD. However, as the optical signal processed by an optical module becomes faster; the optical sensing area of the PD becomes smaller in order to reduce parasitic capacitance of the PD and to respond such a fast signal. For instance, a PD operable in a transmission speed of 25 Gbps provides the sensing area with a diameter of 40 µm, another PD for a transmission speed of 50 Gbps is allowed to provide a sensing area with a diameter only 30 µm, and a positional deviation from the lens within 10 µm.

One type of resin, namely, non-crystalline thermo-plastic PolyEtherimide generally called as ULTEM™ has been widely used in optical modules to cover optical semiconductor devices because ULTEM™ is substantially transparent for an optical beam subject to the optical module and easily formed in various shapes. The resin usually integrates monolithic lenses formed by a surface shape of the resin, where the monolithic lenses are coupled with the semiconductor devices. However, such resin (ULTEM™) intrinsically shows a large difference in the thermal expansion co-efficient with respect to a glass epoxy, which is generally called as FR4 and widely used for a printed circuit board (PCB). That is, the ULTEM™ has the linear thermal expansion co-efficient of 55.8 ppm/° C., while, that of the FR4 is 13 ppm/° C. Accordingly, the optical coupling efficiency between a PD mounted on the PCB made of FR4 and the concentrating lens formed by the ULTEM degrades as an ambient temperature increases or decreases from a designed temperature.

The optical module 20 of the present embodiment provides two bodies as an optical coupling member between semiconductor devices mounted on the circuit hoard 10 and the inner fiber 9 assembled with the optical module 20. Specifically, the optical module 20 provides the frame 30 made of LCP that mounts lens 22 having two lens elements 22a for the optical transmission and the optical reception, and the coupling block 40 that couples the inner optical fiber 9 with the lens elements 22a mounted on the frame 30. Although the thermal expansion co-efficient of the coupling block 40 made of ULTEM™ is largely different from that of the circuit hoard 10 that mounts the semiconductor devices 12 and 14 thereon, the optical module 20 of the present embodiment provides the frame 30 between the coupling block 40 and the circuit board 10, the large difference in the thermal expansion co-efficient between the coupling block 40 and the circuit board 10 may be effectively compensated.

A difference in the thermal expansion coefficient between the coupling block 40 and the frame 30 should be necessary to be taken into account. However, optical beams passing through the coupling block 40 are converted into a collimated beam, whose diameter is around from 0.5 to 0.7 mm; the difference in the thermal characteristics of respective members, namely, the frame 30 and the coupling block 40, may be far lesser compared with that between the frame 30 and the circuit board 10.

Figure 5A:
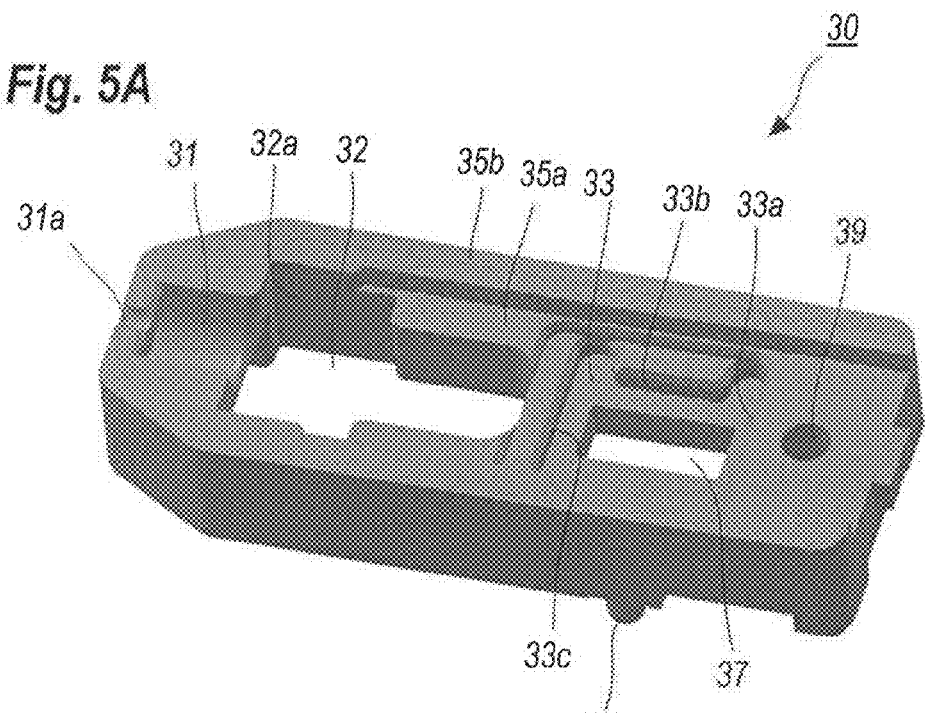
FIG. 5A is a perspective view of the top of the frame.
Figure 5B:
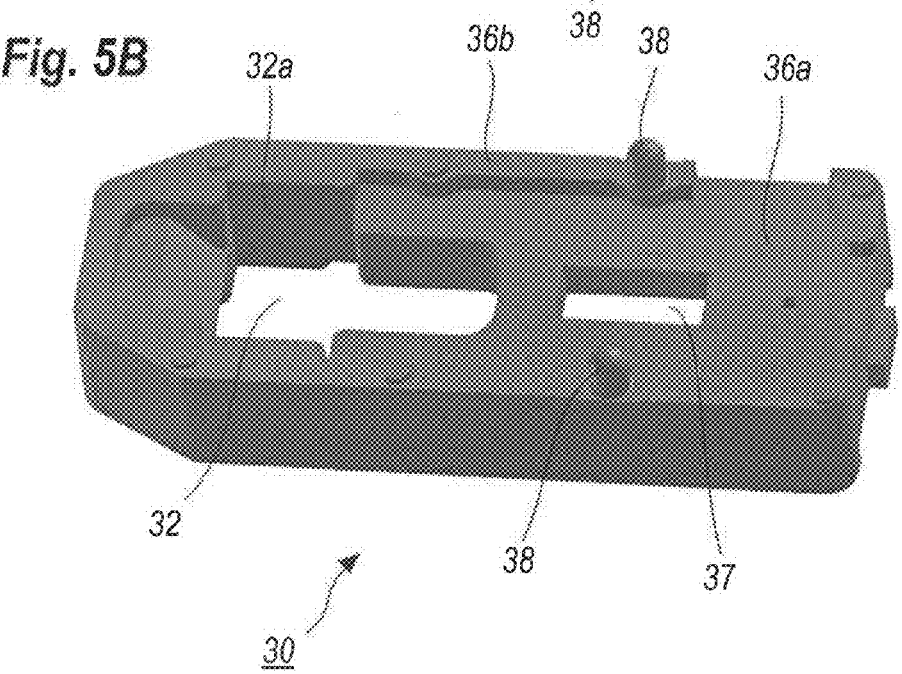
FIG. 5B is a perspective view of the bottom of the frame.

FIG. 5A is a perspective drawing of the frame 30 viewed from the top, and FIG. 5B is also a perspective drawing of the frame 30 viewed from the bottom. The frame 30 has a rectangular solid with chamfered front sides. The front end of the frame 30 provides a guide groove 31a into which the inner fiber 9 is set. Continuous to the guide groove 31a, the frame 30 provides a first pocket 31, which corresponds to the first pocket 41 provided in the coupling block 40, where the front lens 46 formed in the coupling block 40 exposes and protrudes therein. Behind the first pocket 31, the frame 30 forms a large front cavity 32 with a pair of alignment sides 32a.

As explained later in the specification, the alignment sides 32a abut against the alignment sides 47a provided in the coupling block 40, which may partially determine a positional relation between the frame 30 and the coupling block 40 along the lateral direction of the frame 30. The other positional relation along the longitudinal direction may be determined by setting the guide pin 49 provided in the coupling block 40 into the guide hole 39 in the frame 30. As described above, the positional accuracy between the frame 30 and the coupling block 40 necessary for the optical coupling between the frame 30 and the coupling block 40 is not comparable with that between the frame 30 and the circuit board 10. The coupling block 40, when the guide pin 49 thereof is set within the guide hole 39 of the frame 30, the coupling block 40 may rotate by the guide pin 49 as a center of the rotation within gaps between respective alignment sides, 32a and 37a. However, this gap is only several micron meters enough smaller than the positional tolerance between two members of the frame 30 and the coupling block 40. The mechanism of the guide pin 49 combined with the alignment sides, 32a and 37a, may realize enough accuracy between the frame 30 and the coupling member 40 requested to the optical module 20.

Next to the front cavity 32, the frame 30 provides the top hollow 35a between two top mounds 35b in respective sides of the frame 30. That is, the top hollow 35a is surrounded by the top mounds 35b. The top hollow 35a sets the coupling block 40 thereon. On the other hand in the bottom of the frame 30, the bottom hollow 36a is surrounded by the bottom mounds 36b such that the bottom hollow 36a secures a space where the semiconductor devices mounted on the circuit board 10 are enclosed. The frame 30 further provides, next to the front cavity 32, the rear opening 37 in almost a center of the top hollow 35a. The rear opening 37 pierces from the top hollow 35a to the bottom hollow 36a. The lens 22 having collimating/concentrating lens elements 22a, which is primarily made of silica glass in the present embodiment, fully covers the rear opening 37. This lens 22 operates as a collimating lens for the optical beam emitted from an LD 12 mounted on the circuit board 10 and a concentrating lens for the optical beam toward the PD 14 also mounted on the circuit board 10.

Figure 6A:
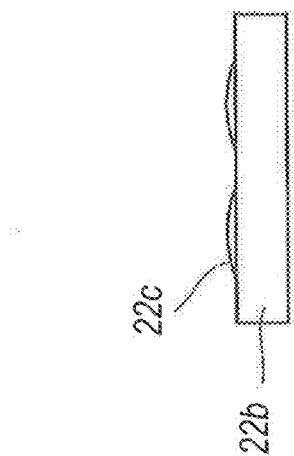
FIGS. 6A to 6C show various arrangements of the concentrating/collimating lens set in the fifth pocket of the frame.
Figure 6B:
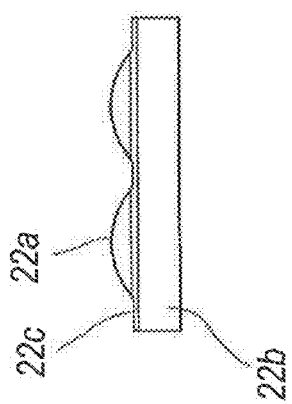
Figure 6C:
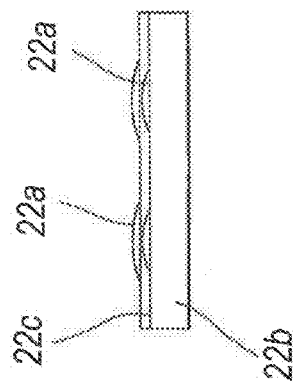

The lens 22 of the present embodiment is made of silica glass, specifically, formed by etching a silica glass or pressing a softened silica glass. However, the lens 22 may be type of a replica lens made of epoxy resin mounted on the silica substrate, or mounted on the lens array made of the silica glass, as shown in FIGS. 6A to 6C. For the arrangements shown in FIGS. 6B and 9C, assuming the silica substrate 22b or the silica lens has a thickness of 0.4 mm and the epoxy resin 22c has a thickness of 0.05 mm, the composite thermal expansion co-efficient of the silica substrate 22b and the epoxy resin 22c becomes 13.6 ppm/° C., which is nearly equal to that of the circuit board 10 made of FR4. The lens shown in FIG. 6B provides the silica substrate 22b mounting the epoxy resin 22c with a lens element 22a in a surface thereof; while, the lens shown in FIG. 6C provides also the silica substrate 22b and the epoxy resin 22c but not only the epoxy resin 22c but the silica substrate 22b forms the lens element 22a in the surface thereof. Accordingly, the curvature of the lens element 22a of the lens shown in FIG. 6C is dulled. A dulled surface of not only the resin 22c but the silica 22b is formed in facilitated. Thus, the lens made of composite materials is preferable for the optical module 20 of the present embodiment.

The lens 22 is set within the fifth pocket 33 of the frame 30, where the fifth pocket 33 is formed in a center of the top hollow 35a and provides the rear opening 37 therein. As already described, the optical alignment between the lens 22 mounted on the frame 30 and the optical devices mounted on the circuit board 10 is one of key factors of the optical module 20 of the present invention. The lens 22 is mounted in the fifth pocket 33 such that the rear edge and one of the side edges abut against the rear edge 33a and the side edge 33b of the fifth pocket 33, respectively. Accordingly, the lens 22 form gaps against the front edge 33c and the other side edge of the fifth pocket 33. Moreover, the frame 30 provides guide pins 38 in respective bottom mounds 36b, which are to be inserted into the holes 16 provided in the circuit board 10. The guide pins 38 are set between the positions where the PD 14 and the LD 12 are mounted, respectively. That is, the guide pins 38 sandwich the PD 14 and LD 12 arranged along the lateral direction on the circuit board 10 therebetween, which may enhance the alignment of those devices, 12 and 14, with the lens 22 on the frame 30.

In the rear of the fifth pocket 33, the frame 30, exactly, the top hollow 35a of the frame 30 provides a guide hole 39 that receives the guide pin 49 provided in the bottom of the coupling block 40. Specifically, the coupling block 40 is set on the top hollow 35a of the frame 30 as inserting the guide pin 49 into the guide hole 39 and the alignment sides 47a are put between the alignment sides 32a of the front cavity 32. Two alignment sides, 32a and the 47a of the frame 30 and the coupling block 40, respectively, form a gap therebetween when the front block 47 of the coupling block 40 is set into the front cavity 32 of the frame 30, which misaligns the lens 20 with the coupling block 40. That is, the coupling block 40 may rotate within a range of the gap between the alignment sides, 32a and 47a, with the guide pin 49 as the center of the rotation. However, the optical beams passing through the coupling block 40 are converted into respective collimated beams, and the lens 22 is set closer to the guide hole 39 with respect to the alignment sides 32a in the front cavity, the misalignment between the coupling block 40 and the frame 30 at the position where the lens 22 is mounted becomes ignorable.

FIG. 7A is a perspective view of the top of the coupling block 40 of the optical module 20 according to the first embodiment of the present invention. FIG. 7B is a perspective view of the bottom of the coupling block 40. The coupling block 40 may be made of, as already described, non-crystalline thermoplastic PolyEtherimide, which is generally called as ULTEM™, substantially transparent for light output from and input to the optical module 20 of the present embodiment. Specifically, the light subject to the present optical module 20 has wavelengths around 0.94 μm corresponding to the energy gap of gallium arsenide (GaAs). As shown in FIGS. 7A and 7B, the coupling block 40 provides several pockets from the front to the rear and in the top and the bottom thereof to form a front lens 46 and a plurality of mirror surfaces.

Specifically, the coupling block 40 provides, in the front end thereof, a guide groove 41a that sets the inner fiber 9 therein combined with the groove 31 of the frame 30. That is, two guide grooves, 41a and 31a, form a bore through which the inner fiber 9 is set. In the present embodiment, the inner fiber 9 is a type of the multi-mode fiber. Next to the guide groove 41a, the coupling block 40 provides the first pocket 41 with a rear wall 41b providing the front lens 46. The front lens 46 has the function to collimate the optical beam coming from the inner fiber 9 and concentrate another optical beam output therefrom on the end of the inner fiber 9. Behind the front lens, the coupling block 40 provides the front block 47 in the bottom thereof. As already described, the front block 47 is set within the front cavity 32 of the frame 30 to align the coupling block 40 with the frame 30.

Next to the front block 47, the coupling block 40 provides the projection 45 whose cross section is a triangle constituted by the first refracting surface 45a and the second refracting surface 45b. The optical characteristics of those refractive surfaces, 45a and 45b, will be explained later. The top of the coupling block 40 provides the second pocket 42 in the position between the front block 47 and the projection 45 in the bottom surface. The second pocket 42 provides the second mirror surface in the rear wall 42b thereof. Referring to the bottom again, the coupling block 40 further provides the third pocket 43 behind the projection 45. In the rear of the third pocket 43, the wavelength division multiplex (WDM) filter 24 is set with a gap against the rear wall 43b of the third pocket 43. That is, the rear wall 43b of the third pocket 43 has steps in respective sides. The WDM filter 24 is attached to the upper step so as to form a gap against the lower step of the rear wall 43b. Surplus adhesive to fax the WDM filter 24 to the coupling block 40 flows in respective sides of the steps so as not to interfere the optical beam passing through the WDM filter 24.

Next to the third pocket 43, the coupling block 40 provides the fourth pocket 44 in the top, while, the input and output surfaces, 48a and 48b, respectively, in the bottom. The fourth pocket 44 has the first mirror surface in the front wall 44a thereof. The input and output surfaces, 48a and 48b, are inclined with respect to the primary surface of the bottom of the coupling block 40. The optical beam output from the LD 1.2 on the circuit board. 10 enters the input surface 48a as being collimated by the lens 22 mounted on the frame 30, while, the PD 14 also on the circuit board receives the optical beam output from the output surface 48b as being concentrated by the lens 22. Because these two surfaces, 48a and 48b, are inclined with respect to the primary surface of the circuit board 10, the optical beams are not reflected backwardly. That is the optical beam output from the LD 12 does not return to the LD 12, and the optical beam coming from the inner fiber 9 does not return to the inner fiber 9.

Figure 8:
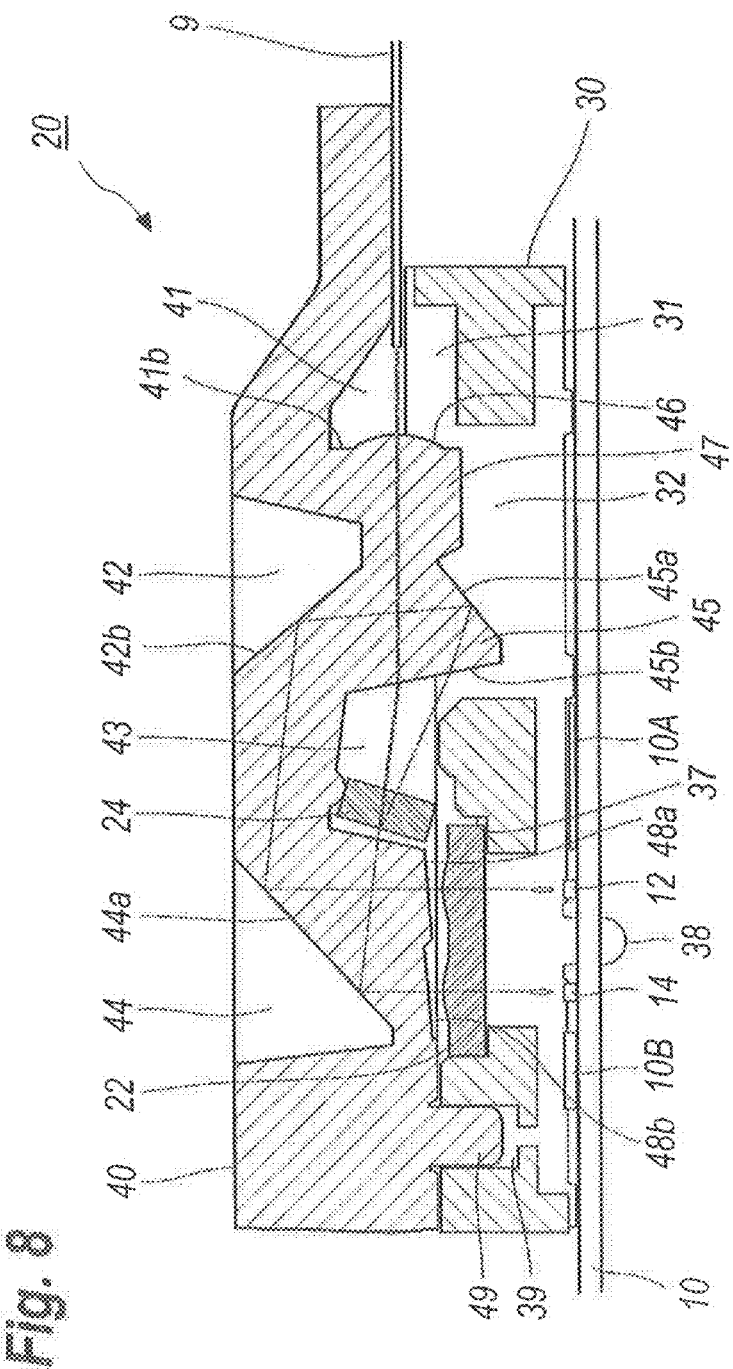
FIG. 8 shows a cross section of the optical module.

FIG. 8 shows a cross section of the optical module 20 shown in FIGS. 3 to 7, where FIG. 8 is taken along the optical axis of the inner optical fiber 9. First, the optical coupling of the optical beam entering the optical module 20 from the inner fiber 9 will be explained.

The optical beam output from the tip end of the inner fiber 9, which is hereafter denoted as Rx beam, is firstly collimated by the front lens 46 formed in the rear wall 41b of the first pocket 41, or the front wall of the front block 47. The Rx beam passing through and collimated by the front lens 46 advances in straight within the front block 47 to the second refracting surface 45b of the projection 45, namely, the rear wall 45b of the projection 45. Then, being refracted thereat, the Rx beam enters the WDM filter 24 by the incident angle of about 10° and passes through the WDM filter 24.

The Rx beam, then, enters the coupling block 40 again and reflected by the first mirror of the front wall 44a of the fourth pocket 44 toward the output surface 48b. Being output from the output surface 48b, the Rx beam passes the lens 22, which has the function of the concentrating lens, and focused on the PD 14 mounted on the circuit board 10. Thus, the Rx beam coming from the inner fiber reaches the PD 14 by a shorter path compared with that of the optical beam output from the LD 12 described below, which is hereafter denoted as the Tx beam.

That is the Tx beam output from the LD 12 on the circuit board 10 is firstly collimated by the lens 22 placed above the LD 12, then, enters the coupling block 40 from the input surface 48*a*. The Tx beam entering the coupling block 40 is reflected frontward by the first mirror surface of the front wall 44*a* of the fourth pocket 44, passes above the WDM fitter 24 in the coupling block 40, reflected downward by the second mirror surface of the rear wall 42*b* of the second pocket 42, reflected by the front refractive surface 45*a* of the projection 45, once output from the rear wall 45*b* of the projection 45, enters the WDM filter 24 and reflected thereby, enters again the rear refracting surface 45*b* of the projection, and finally concentrated by the front lens 46 on the end of the inner fiber 9. Thus, the Tx beam output from the LD 12 travels round the WDM filter 24 and enters from the front of the WDM filter 24 so as to be reflected frontward by an acute angle.

The optical module 20 of the present embodiment, the Rx beam coming from the inner fiber 9 enters the WDM filter 24 by an acute angle and passes therethrough. On the other hand, the Tx beam emitted from the LD 12 on the circuit board enters the WDM filter 24 also by an acute angle and reflected thereby toward the inner fiber 9. Although the Tx beam output from the LD 12 travels all the way in the coupling block 40 round the WDM filter 24, the LD 12 may optionally adjust the optical output power thereof by varying driving conditions thereof. On the other hand, the PD 14 receives the Rx beam provided from the inner fiber 9 but the optical power thereof is not adjustable. Accordingly, the optical module 20 of the present embodiment, the Rx beam enters the PD 14 in the shortest path; but, the Tx beam takes a roundabout path in the coupling block 40. The optical loss due to the roundabout path may be compensated by adjusting the driving conditions of the LD 12.

Second Embodiment

Figure 9A:
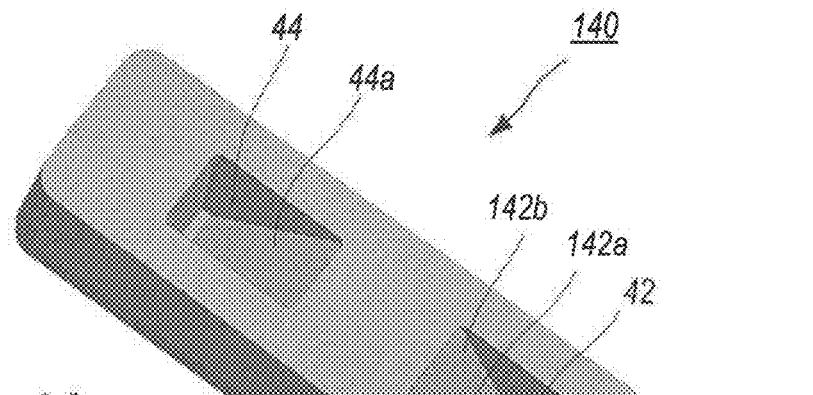
FIG. 9A is a perspective view of the top of another coupling block according to the second embodiment of the present invention.
Figure 9B:
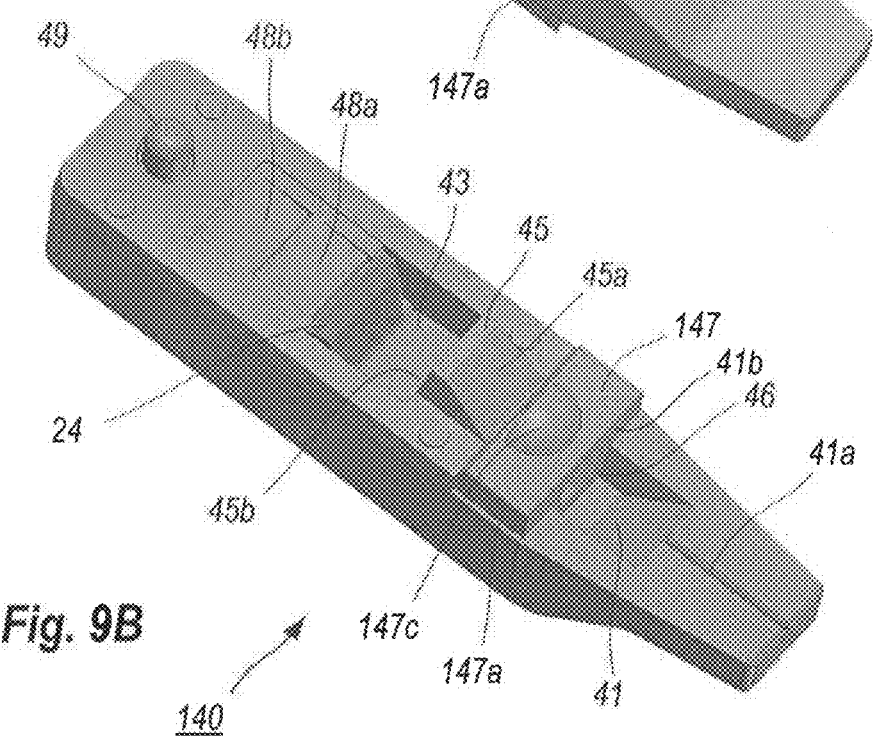
FIG. 9B is a perspective view of the bottom of the coupling block.
Figure 10:
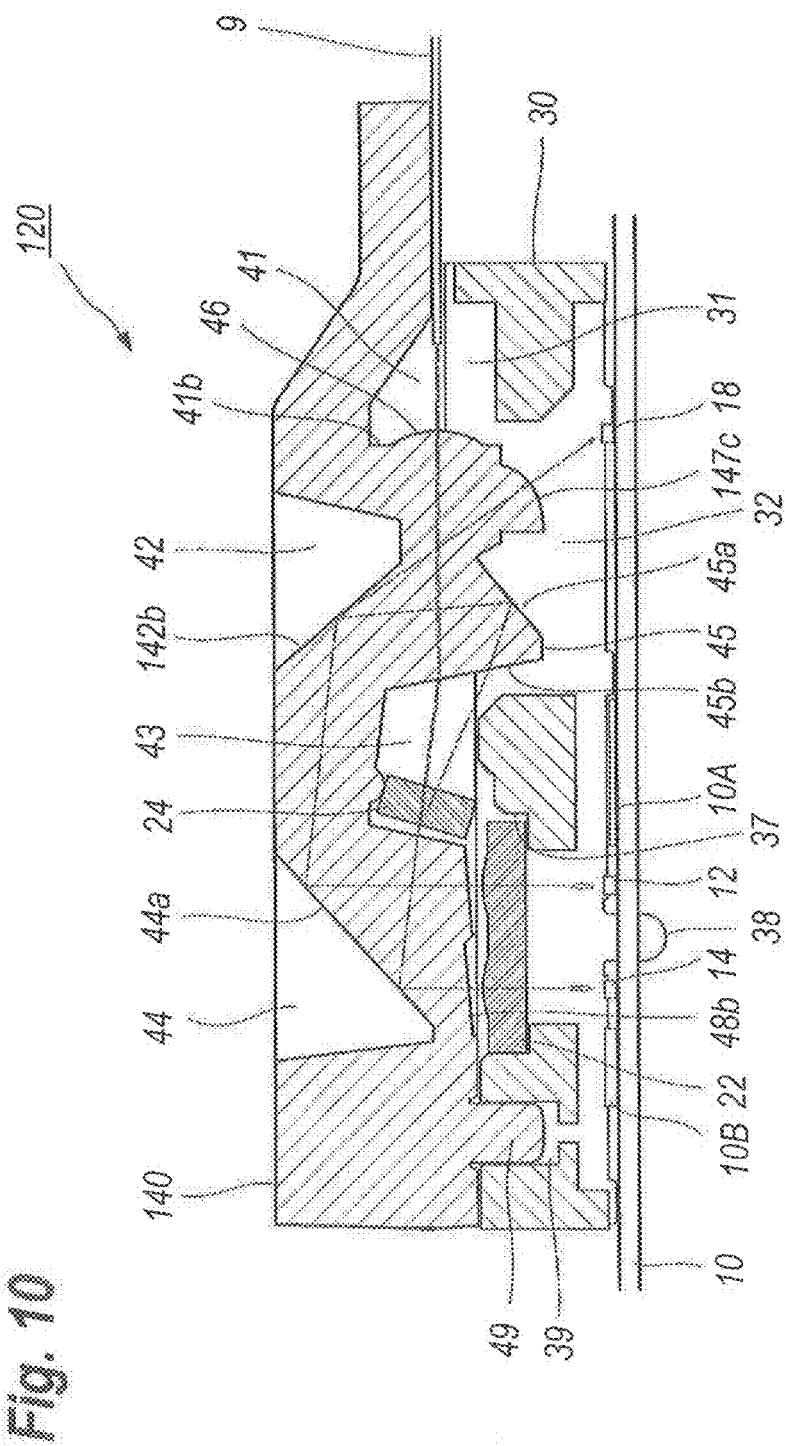
FIG. 10 shows a cross section of the optical module that provides the coupling block shown in FIGS. 9A and 9B.

FIG. 9A is a perspective view of the top of another coupling block 140 according to the second embodiment of the present invention, and FIG. 9B is a perspective view of the bottom of the coupling block 140. FIG. 10 is a cross section of the optical module 120 that provides the coupling block 140 shown in FIGS. 9A and 9B, where FIG. 10 is taken along the optical axis of the inner fiber. The coupling block 140 of the second embodiment has a feature, distinguishable from those of the first embodiment, that the coupling block 140 further provides an auxiliary lens 147*c* in the front block 147, and the rear wall 142*b* instead of the rear wall 42*b* having the function of the reflecting surface. Other arrangements of the coupling block 140 are substantially equivalent to those of the first embodiment shown in FIGS. 7A and 7B.

Referring to FIG. 10, the Rx beam output from the inner fiber 9 enters the PD 14 after tracing the paths same as those of the first embodiment. However, the Tx beam emitted from the LD 12 is divided into two portions at the rear wall 142*b* of the second pocket 142 which differs from the rear wall 42*b* of the first embodiment. Specifically, the Tx beam reflected at the first mirror surface 44*a* reaches the rear wall 142*b* of the second pocket 142. The first portion of the Tx beam is reflected at the refracting surface 142*b* toward the first refracting surface 45*a* of the projection 45, which is same as that of the first embodiment. On the other hand, the second portion of the Tx beam reaching the rear wall 142*b* is also reflected thereat but toward the auxiliary lens 147*c* and concentrated by the auxiliary lens 147*c* on the monitor PD (m-PD) 18 mounted on the circuit board 10. Thus, the m-PD 18 may monitor the optical output power of the Tx beam emitted from the LD 12.

FIG. 11 magnifies the rear wall 142*b* of the second pocket 142 shown in FIG. 10. As shown in FIG. 11, the rear wall 142*b* provides two components, the first surface and the second surface, each having an angle different from others. A portion of the Tx beam coming from the first reflecting surface 44*a* entering the second surface 142*b* is reflected toward the first refracting surface 45*a* as that of the first embodiment; but, a rest portion of the Tx beam entering the second surface 142*a* is reflected toward the auxiliary lens 147*c*. Moreover, a ratio of two Tx beams fully depends on the surface ratio of the two surfaces, 142*a* and 142*b*, which may be simply determined. Usually, the first surface 142*b* becomes a primary portion of the rear wall 142*b* of the second pocket 42. Thus, a structure formed by those two surfaces, 142*a* and 142*b*, is sometimes called as a blip.

The optical module of the present embodiment provides the m-PD 18 to monitor the optical power of the Tx beam output from the LD 12 mounted on the circuit board 10. The output power of the Tx beam concentrated on the inner fiber may be maintained by feeding the electrical output of the m-PD 18 back to the driving conditions of the LD 12 such that the driver 10A provides a bias current to the LD 12 so as to keep the amplitude of the m-PD 18 equal to a target level.

Also, even in the optical module 120 of the second embodiment, both the Rx beam and the Tx beam enter the WDM filter 24 by an acute angle only slightly deviating from the normal of the surface of the WDM filter 24. Accordingly, the wavelength discriminating performance of the WDM filter 24 may be enhanced, or may show the designed performance thereof.

Third Embodiment

Figure 12A:
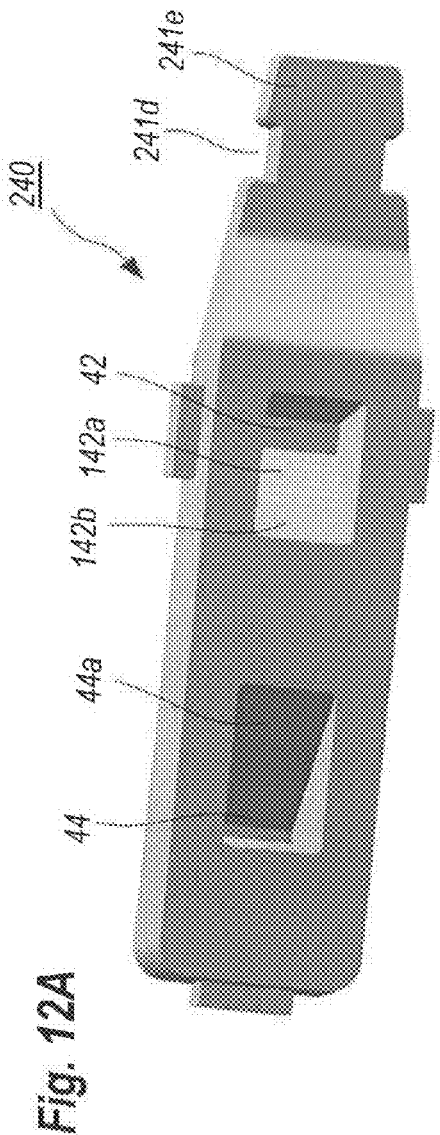
FIG. 12A is a perspective view of the top of still another coupling block according to the third embodiment of the present invention.
Figure 12B:
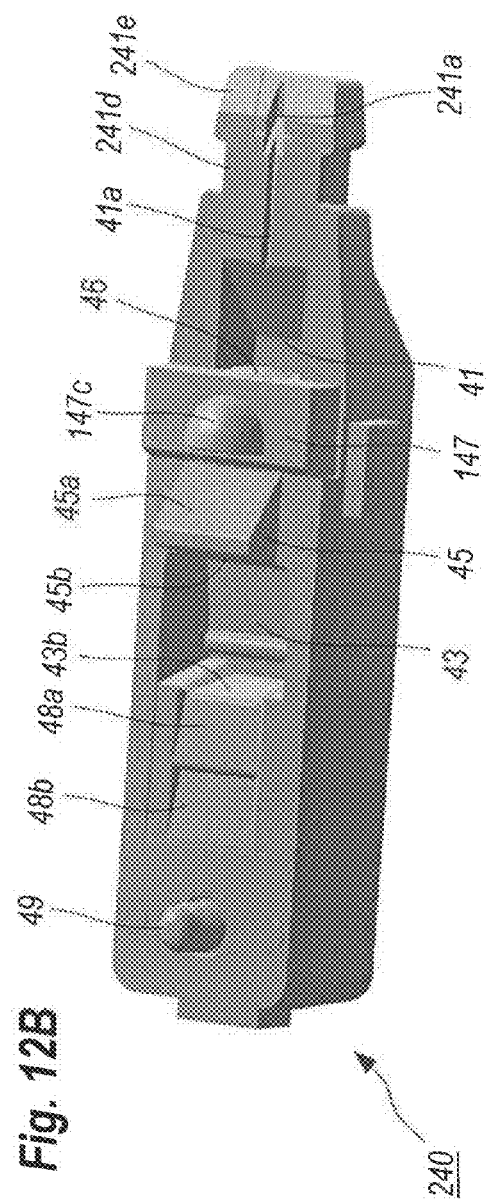
FIG. 12B is a perspective view of the bottom of the coupling block.

FIG. 12A is a perspective view of the top of still another coupling block 240 according to the third embodiment of the present invention, and FIG. 12B is a perspective view of the bottom of the coupling block 240. The coupling block 240 of the third embodiment has an arrangement similar to the coupling block 240 of the second embodiment shown in FIGS. 9A and 9B but provides a feature distinguishable from those of the second embodiment that the front end thereof has a hammer head structure 241*e* formed by a cut 241*c*. The hammer head 241*e*, as described below, mates with the output port 55*b* of the bobbin 50. Also, the end of the groove 41*a* into which the inner fiber 9 is set provides a widened portion 241*a*, which may release the inner fiber 9 freely. The inner fiber 9 of the embodiment is wound by the bobbin 50, which possibly causes a mechanical stress to the inner fiber 9 at a portion just released from the coupling block 240. The widened groove 241*a* may prevent the inner fiber 9 from being bent by a greater curvature at the end of the groove 241*a*.

Figure 13:
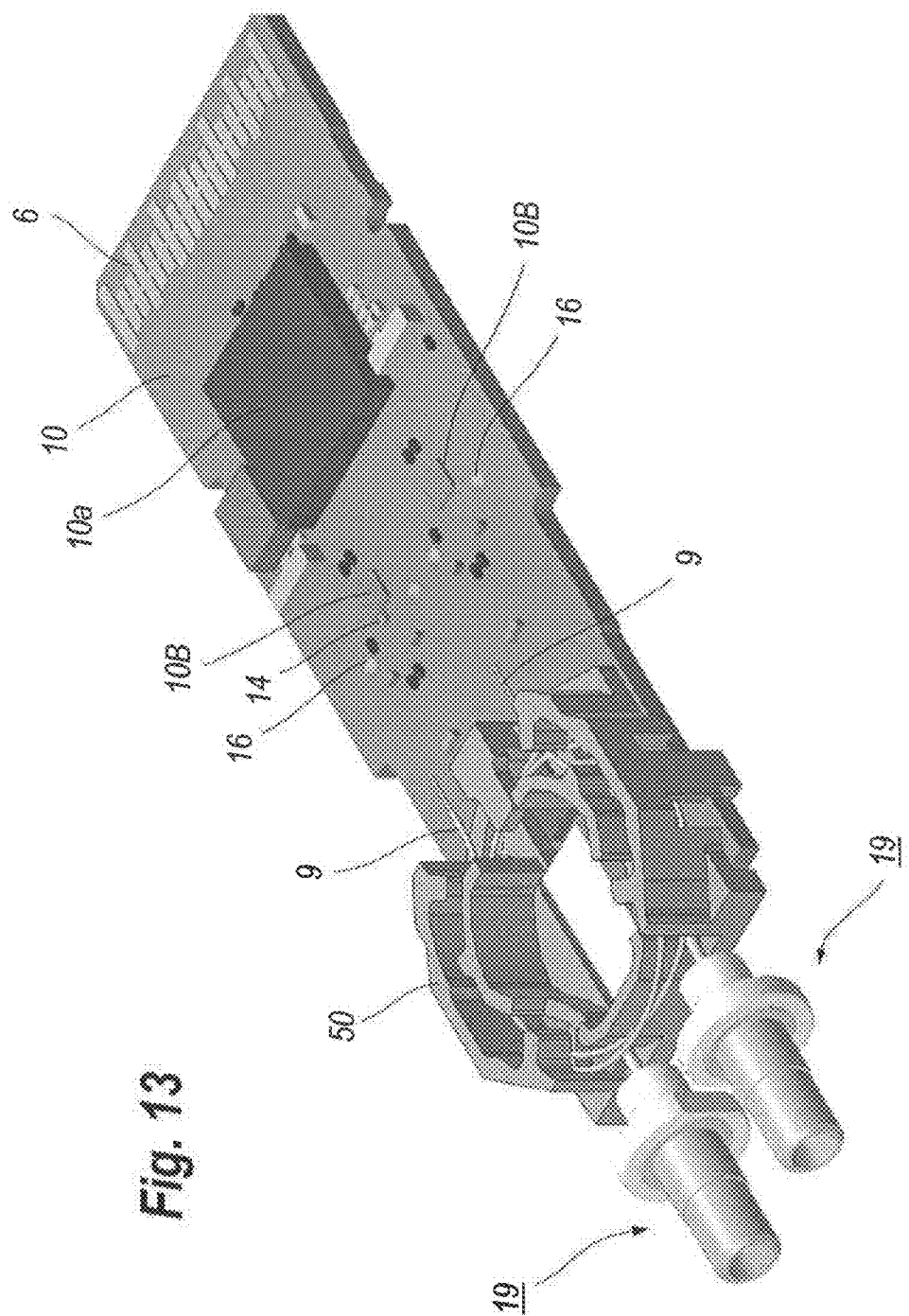
FIG. 13 is a perspective view of the circuit board mounting the fiber bobbin.

FIG. 13 is a perspective view of the circuit board 10 that mounts the fiber bobbin 50 and the electronic circuit 10*a*, where FIG. 13 omits the optical modules 20, the LD 12, and the driver 10A mounted thereon. The circuit board 10 provides the holes 16, exactly four holes, arranged along the lateral direction. Left two holes sandwich one of the optical module 20A, while, right two holes sandwiches another of the optical module 20B. Optical devices, namely, the LD 12 and the PD 14, are mounted just between respective two holes. This arrangement may enhance the optical alignment between the optical devices, 12 and 14, on the circuit board 10 with the lens 22 mounted on the respective frames, 30A and 30B.

Although the optical devices, 12 and 14, of the embodiment expose the optically active surfaces, that is, the light emitting surface of the LD 12 and the light receiving surface of the PD 14, the optical devices, 12 and 14, are preferably covered with, for instance, optically transparent resin and the like. This arrangement, which is often called as the potting, may protect the surface of the optical devices, 12 and 14, and enhance the reliability thereof.

FIG. 14A shows a top and FIG. 14B shows a bottom of the fiber bobbin 50. The fiber bobbin 50, which may be made of mold resin, provides a flat bottom surface 51 with a pair of legs 52a and a front fence 52b each extending downward from the bottom surface 51. The legs 52a having hooks in respective ends sandwich the circuit board 10 therebetween by hooking the back surface of the circuit board 10 by the hooks. The front fence 52b is aligned with the front edge of the circuit board 10. Thus, the fiber bobbin 50 may be mounted in the front end of the circuit board 10 without any screws and/or adhesive materials. The fiber bobbin 50, in the top thereof, provides inner fences 54a, outer fences 54b, and a ringed aisle 54c between these two fences, 54a and 54b. The inner fiber 9 is set within the ringed aisle 54c as being wound around the inner fences 54a. The ringed aisle 54c continues the input port 55a in the front and the output port 55b in the rear from which the inner fiber 9 is guided. Two input ports 55a corresponding to the respective optical ports 19 are divided, by a portion of the inner fence 54a while, two output ports 55b corresponding to the respective optical modules 20 are dived by a center partition 54d. Also, the ringed aisle 54c provides several tabs 56 extended from the inner fences 54a and the outer fences 54b. The tabs 56 partially cover the ringed aisle 54c such that the inner fiber 9 once set within the ringed aisle 54c do not pop out therefrom. In the present fiber bobbin 50, the inner fences 54a surround an opening 53 through which some electrical components mounted on the circuit board 10 become accessible, which may enhance the density of the assembled components.

Figure 15A:
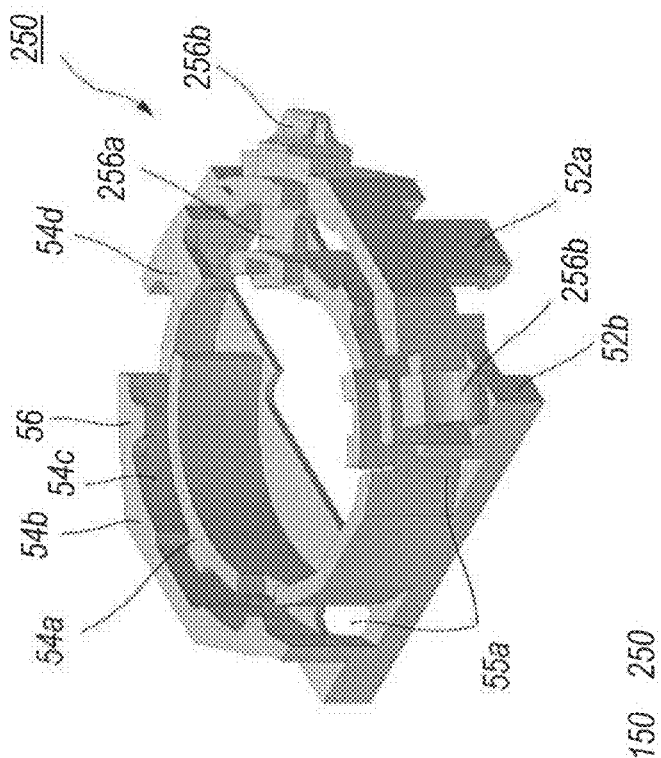
FIG. 15A shows another fiber bobbin modified from the fiber bobbin shown in FIGS. 14A and 14B.

FIG. 15A shows another fiber bobbin modified from the fiber bobbin shown in FIGS. 14A and 14B. The fiber bobbin 150 has a feature distinguishable from the former fiber bobbin 50 that the fiber bobbin 150 further provides a rear fence 157 with two output ports 155b. Other arrangements of the fiber bobbin 150 are substantially same with those of the aforementioned fiber bobbin 50. The fence 157 provides the output port 155b of a rectangular shape accompanied with a cut extending from the output port 155b to a top edge of the fence 157. As shown in FIG. 16, the fence 157 may temporarily hold the hammer head 241e by passing the cut 241d of the coupling block 240 through the cut in the fence 157.

Figure 15B:
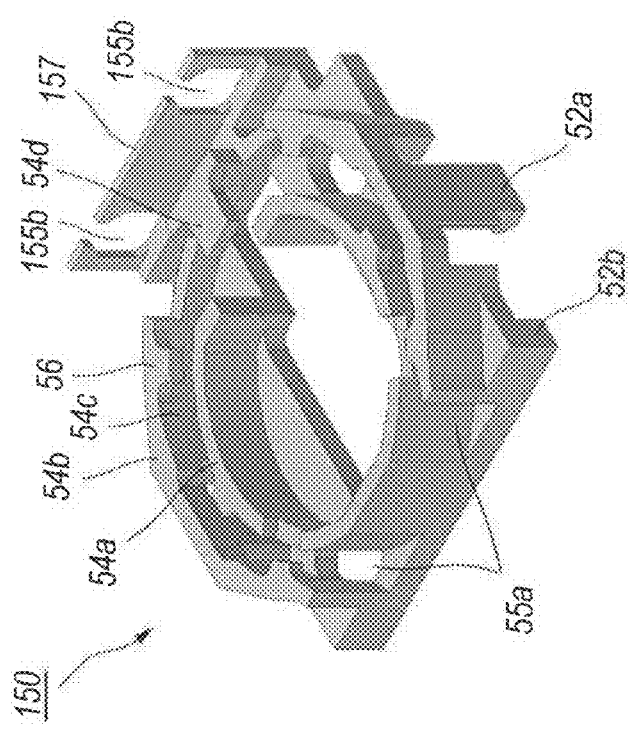
FIG. 15B shows still another fiber bobbin also modified from that shown in FIGS. 14A and 14B.

FIG. 15B shows still another fiber bobbin 250 also modified from that shown in FIGS. 14A and 14B. The fiber bobbin 250 has a feature that the ringed aisle 54c is partially covered with the knob 256a which extends from the hinge 256b. The knob 256a in one end thereof extends from the hinge 256b, and the hinge 256b extends from the outer fence 54a. The other end of the knob 256a is hooked on the inner fence 54a. Because the hinge 256a has an elastically bent portion in a midway thereof, the knob 256a may be elastically hooked on the inner fence 54a. Moreover, that knob 256a fully covers the ringed aisle 54c from the inner fence 54a to the outer fence 54b, the inner fiber 9 set within the ringed aisle 54c may prevented from popping out off from the ringed aisle 54c. The tabs 56 provided in the former fiber bobbins, 50 and 150, partially cover the ringed aisle 54c, the fiber 9 set therein is possibly spilt off from the ringed aisle 54c. The knob 256a of the present fiber bobbin 250 fully covers the ringed aisle 54c, the fiber 9 is never popped out therefrom. Moreover, the knob 256a with the hinge 256b may be formed integrally with the body of the fiber bobbin 250.

Figure 17A:
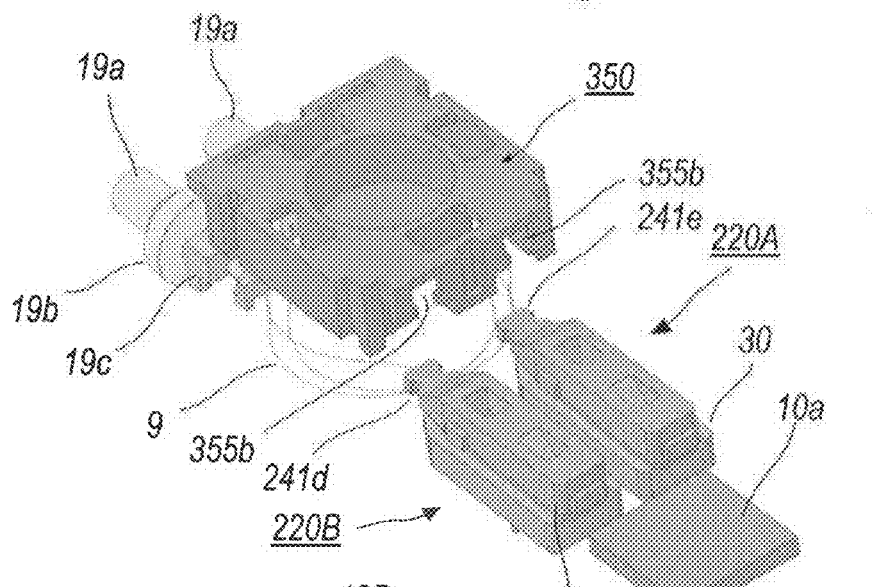
FIGS. 17A and 17B show another intermediate assembly of the optical ports and the optical modules optically coupled with inner fibers wound in the fiber bobbin having still another arrangement, where FIG. 15A views the intermediate assembly from a top, while, FIG. 15B views the intermediate assembly from the bottom.
Figure 17B:
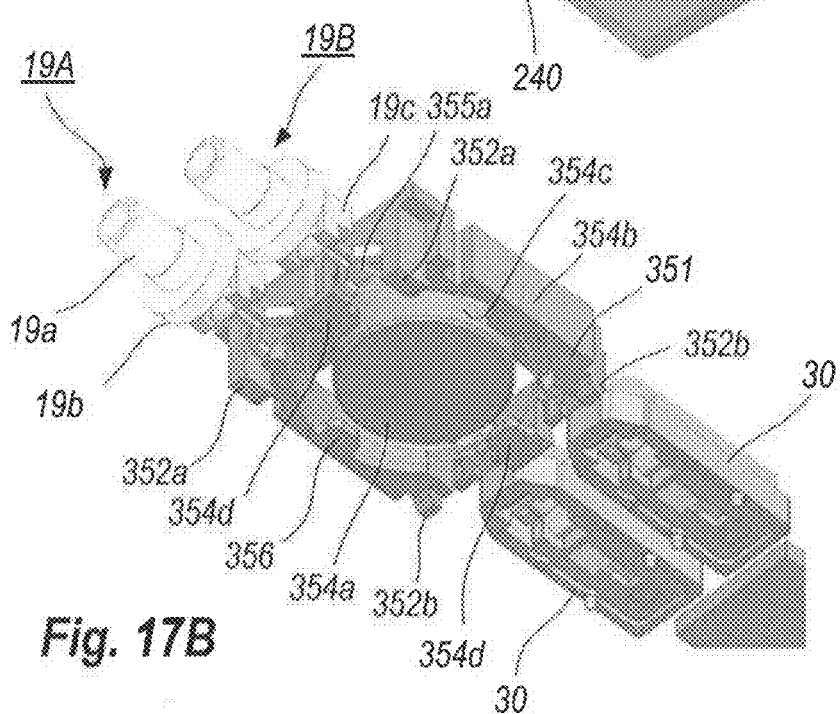

FIGS. 17A and 17B show another intermediate assembly of the optical ports 19 and the optical modules 220 (220A and 220B) optically coupled with inner fibers 9 wound in the fiber bobbin 350 having still another arrangement, where FIG. 15A views the intermediate assembly from a top, while, FIG. 15B views the intermediate assembly from the bottom;

The fiber bobbin 350 provides input ports 355a modified from the input port 55a shown in FIG. 14A and output ports 355b. Also, the paired legs 52a and the front fence 52b are replaced to four legs, 352a and 352b, having hooks in respective ends thereof to hook the back surface of the circuit hoard 10. Because these legs, 352a and 352b, are arranged in the front end and the rear end of the fiber bobbin 350, the circuit board 10 is necessary to provide cuts corresponding to the rear legs 352b. The outer fence 354b and a center column 354a form the ringed aisle 354c therebetween, but the ringed aisle 354c is opened toward the circuit board 10. Winding the inner fiber 9 around the center column 354c and mounting the fiber bobbin 350 onto the circuit board 10, the inner fiber 9 does not pop out from the ringed aisle 354c.

The fiber bobbin 350 of the present embodiment has a feature that the input ports 355a thereof may secure the boots 19c of the optical ports, 19A and 19B. Specifically, the optical ports, 19A and 19B, of the present embodiment shown in FIGS. 17A and 17B, further provide respective boots 19c for covering the rear portions thereof, namely, portions behind the flanges 19b. The boots 19c are hooked with the input ports 355a of the fiber bobbin 350. Thus, the optical ports, 19A and 19B, may be temporarily assembled with the fiber bobbin 150. Also, as already described, the coupling block 240 of the optical module 220 provides the hammer head 241e in the front end thereof. Hooking the hammer head 241e with the output port 354b of the fiber bobbin 350, the optical module 220 may be also temporarily assembled with the fiber bobbin 350. Accordingly, the optical ports, 19A and 19B, are temporarily coupled with the optical modules, 220A and 220B, as interposing the fiber bobbin 150 during the assembling process of the optical transceiver 1. FIGS. 17A and 17B omit the circuit board 10 to shows the bottom of the fiber bobbin 350 and that of the bases 30.

Figure 18A:
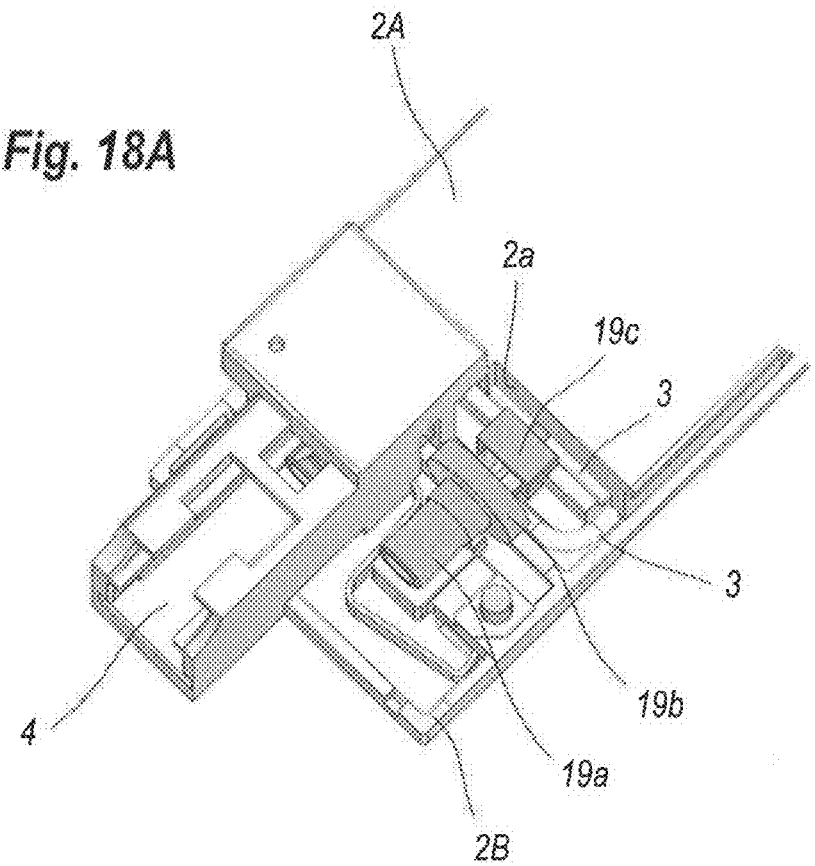
FIG. 18A shows the optical ports set on the bottom housing as partially removing the top housing.
Figure 18B:
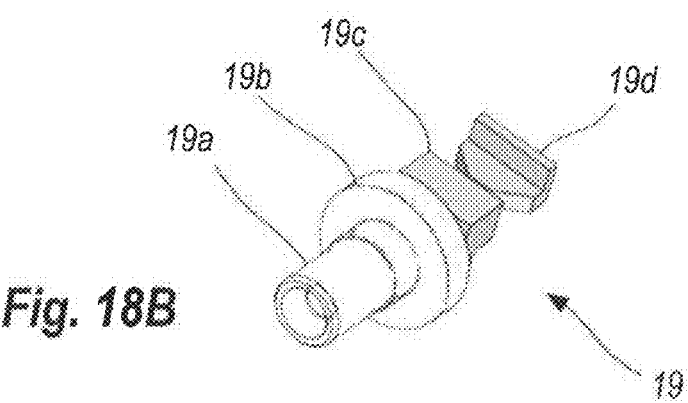
FIG. 18B shows the optical port accompanying with the boot.

FIG. 18A shows the optical ports 19 set on the bottom housing 2B, where FIG. 18A partially cuts the top housing 2A to show the arrangement of the optical port 19 on the bottom housing 2B. FIG. 18B shows the optical port 19. As shown in FIG. 18B, the optical port 19 provides, from the front to the rear, the sleeve 19a that receives a ferrule secured in the end of the external fiber, the flange 19b that positions the optical port 19 with respect to the optical receptacle 4 by sandwiching between the top housing 2A and the bottom housing 2B, the boot 19c that covers a portion of the optical port 19 behind the flange 19b, and a tab 19d that secures the inner fiber 9 extracted from the rear end of the optical port 19 and hooked with the input port 354a of the fiber bobbin 350. Specifically, the boot 19c has a box portion, a necked portion and a widening portion with the tab 19d in the end thereof. Referring to FIG. 18A, the boot 19c at the necked portion thereof pierces the front partition 2a of the top housing 2A that secures the shield gasket 3. The top housing 2A encloses only the widening portion of the boot 19c within the space between two housings, 2A and 2B, and the tab 19d in the rear end of the widening portion is set within the input port 354a of the fiber bobbin 350. Thus, only the necked portion of the boot 19c pierces the front partition 2a and the front partition 2a provides the shield gasket 3, the inner space of the housing 2 may be effectively shielded.

FIG. 19 shows another arrangement of the top housing 2A and the optical port 19, where the optical port 19 has no tabs 19d in the rear of the flange 19b. Only the hoot 19c continues from the flange 19b and the inner fiber 9 extends from the rear end of the hook 19c. The top housing 2A provides, next to the optical receptacle 4, a pocket 2b into which the flanges of the optical ports, 19A and 19B, are set. The sleeves 19a protrude into respective cavities of the optical receptacle to receive the ferrules of the external fibers inserted into the optical receptacle 4. The front partition 2a provides respective cuts 2c through which the inner fiber 9 passes. The cuts 2c are covered with the shield gasket 3. Accordingly, the space formed by the top and bottom housings, 2A and 2B, are effectively shielded in the front portion of the optical transceiver. Conventional optical transceiver without any inner fibers is necessary to couple the electronic circuits on the circuit board 110 with optical subassemblies set behind the optical receptacle 4. Accordingly, such an optical transceiver is necessary to conduct electrical signals just behind the optical subassemblies. This conventional arrangement has inherent disadvantages in a viewpoint of the EMI noises.

While particular embodiments of the present invention have been described herein for purposes of illustration, many modifications and changes will become apparent to those skilled in the art. For instance, although the embodiments thus described concentrate on the arrangement that only one LD emits one Tx light and only one PD receives one Rx light. However, the arrangement of the present optical module may be expandable to those including a plurality of LDs and PDs. Accordingly, the appended claims are intended to encompass all such modifications and changes as fall within the true spirit and scope of this invention.

What is claimed is:

1. A bi-directional optical module mountable on a circuit board, the bi-directional optical module optically coupling a semiconductor laser diode (LD) and a semiconductor photodiode (PD) each mounted on the circuit board with an inner fiber securable in the bi-directional optical module for transmitting a transmitting optical beam output from the LD and a receiving optical beam provided to the PD, the bi-directional optical module comprising:
   a base mountable on the circuit board;
   a lens including a first lens element and a second lens element, the lens being mounted on the base;
   a coupling block mounted on the base, the coupling block optically coupling the transmitting optical beam output from the LD through the first lens element with the inner fiber and the receiving optical beam output from the inner fiber with the PD through the second lens element; and
   a wavelength division multiplexing (WDM) filter secured in the coupling block,
   wherein the receiving optical beam provided from the inner fiber enters the WDM filter at an incident angle of less than 20°, and the transmitting optical beam output from the LD enters the WDM filter at an angle substantially the same as the incident angle of the receiving optical beam,
   wherein the coupling block has an input surface provided to receive the transmitting optical beam output from the LD, three or more mirrors arranged apart from the WDM filter and surrounding the WDM filter, and a coupling surface arranged so that the WDM filter is positioned between the input surface and the coupling surface, and
   wherein the transmitting optical beam output from the LD enters the WDM filter through the coupling surface after passing through the input surface and being subsequently reflected by the three or more mirrors.

2. The bi-directional optical module of claim 1, wherein the incident angle is less than 10°.

3. The bi-directional optical module of claim 1, wherein the coupling block includes a first pocket, a second pocket, a third pocket, and a fourth pocket arranged in this order from a side where the inner fiber is secured, and a projection between the first pocket and the third pocket; the first pocket, the third pocket, and the projection being formed in a bottom surface of the coupling block facing the base; the second pocket and the fourth pocket being formed in a top surface of the coupling block opposite to the bottom surface,
   wherein the third pocket secures the WDM filter,
   wherein the three or more mirrors include mirrors respectively formed at an interface of the fourth pocket, an interface of the second pocket, and an interface of the projection, and
   wherein the transmitting optical beam enters the WDM filter after being reflected at the interface of the fourth pocket, the interface of the second pocket, and the interface of the projection.

4. The bi-directional optical module of claim 3, wherein the WDM filter reflects the transmitting optical beam provided from the interface of the projection toward the inner fiber secured in the first pocket.

5. The bi-directional optical module of claim 4, wherein the transmitting optical beam reflected by the WDM filter enters the inner fiber through a lens formed in an interface of the first pocket.

6. The bi-directional optical module of claim 3, wherein the circuit board further mounts a monitor PD in a portion facing the first pocket, and
   wherein the interface of the second pocket provides a blip making an angle relative to the interface of the second pocket, the blip reflecting a portion of the transmitting optical beam reflected by the interface of the fourth pocket toward the monitor PD.

7. The bi-directional optical module of claim 6, wherein the coupling block further includes an auxiliary lens that concentrates the portion of the transmitting optical beam reflected by the blip on the monitor PD.

8. The bi-directional optical module of claim 1, wherein the coupling block includes a first pocket, a second pocket, a third pocket, and a fourth pocket arranged in this order from a side where the inner fiber is secured, the first pocket and the third pocket being formed in a bottom surface of the coupling block facing the base; the second pocket and the fourth pocket being formed in a top surface of the coupling block opposite to the bottom surface, and
   wherein the receiving optical beam enters the PD after propagating in the coupling block in a portion between the first pocket and the third pocket, transmitting through the WDM filter, and being reflected at an interface of the fourth pocket.

9. The bi-directional optical module of claim 8,
wherein the receiving optical beam provided from the inner fiber enters the WDM filter through a lens formed in an interface of the first pocket.

10. The bi-directional optical module of claim 1,
wherein the coupling block is made of non-crystalline thermo-plastic PolyEtherimide and the base is made of liquid crystal polymer (LCP).

11. The bi-directional optical module of claim 1,
wherein the base provides a guide hole and an opening having a pair of alignment sides, and the coupling block provides a guide pin and a block having a pair of alignment sides, the guide pin being set within the guide hole and the block being set within the opening when the alignment sides of the block come in contact with the alignment sides of the opening.

12. The bi-directional optical module of claim 1,
wherein the base has a pair of guide pins to be inserted into respective holes provided in the circuit board, the guide pins being arranged beside the LD and the PD and sandwiching the LD and PD.

13. A pluggable optical transceiver pluggable into a host apparatus, the optical transceiver comprising:
an optical receptacle that receives an external fiber, the optical receptacle including an optical port;
a bi-directional optical module that provides a semiconductor laser diode (LD) and a semiconductor photodiode (PD), the LD outputting a transmitting optical beam to the external fiber and the PD receiving a receiving optical beam provided from the external optical fiber;
a circuit board that provides a plug for electrically communicating with the host apparatus, the circuit board mounting the optical module thereon; and
an inner fiber that optically couples the optical port in the optical receptacle with the optical module mounted on the circuit board,
wherein the bi-directional optical module includes a base mounted on the circuit board, a lens including a first lens element and a second lens element, the lens being mounted on the base, a coupling block mounted on the base, the coupling block optically coupling the transmitting optical beam output from the LD through the first lens element with the inner fiber and the receiving optical beam provided from the external fiber through the inner fiber with the PD through the second lens element, and a wavelength division multiplexing (WDM) filter secured in the coupling block,
wherein the receiving optical beam provided from the inner fiber enters the WDM filter at an incident angle of less than 10°, and the transmitting optical beam output from the LD enters the WDM filter at an angle substantially the same as the incident angle,
wherein the circuit board further mounts a monitor PD in a portion facing the coupling block,
wherein the coupling block has an input surface arranged at a position to pass the transmitting optical beam output from LD, and a coupling surface arranged so that the WDM filter is positioned between the input surface and the coupling surface, the coupling surface guiding the transmitting optical beam having passed through the input surface to the WDM filter,
wherein the coupling block further has a decoupling surface arranged on an optical path of the transmitting optical beam propagating from the input surface to the coupling surface, and
wherein the decoupling surface provides a blip that makes an angle relative to the decoupling surface of the coupling block and reflects a portion of the transmitting optical beam output from the LD toward the monitor PD.

14. The pluggable optical transceiver of claim 13,
wherein the coupling block includes a first pocket, a second pocket, a third pocket, a fourth pocket arranged in this order from a side where the inner fiber is secured, and a projection between the first pocket and the third pocket; the first pocket, the third pocket, and the projection being formed in a bottom surface of the coupling block facing the base; the second pocket and the fourth pocket being formed in a top surface of the coupling block opposite to the bottom surface,
wherein the third pocket secures the WDM filter, and
wherein the transmitting optical beam enters the WDM filter after being reflected at an interface of the fourth pocket, an interface of the second pocket, and an interface of the projection.

15. The pluggable optical transceiver of claim 14,
wherein the WDM filter reflects the transmitting optical beam provided from the interface of the projection toward the inner fiber secured in the first pocket.

16. The pluggable optical transceiver of claim 13,
wherein the coupling block further includes an auxiliary lens that concentrates the portion of the transmitting optical beam reflected by the blip on the monitor PD.

17. The pluggable optical transceiver of claim 13,
wherein the coupling block includes a first pocket, a second pocket, a third pocket, and a fourth pocket arranged in this order from a side where the inner fiber is secured, the first pocket and the third pocket being formed in a bottom surface of the coupling block facing the base; the second pocket and the fourth pocket being formed in a top surface of the coupling block opposite to the bottom surface, and
wherein the receiving optical beam enters the PD after propagating in the coupling block in a portion between the first pocket and the third pocket, transmitting through the WDM filter, and being reflected at an interface of the fourth pocket.

18. The pluggable optical transceiver of claim 17,
wherein the coupling block is made of non-crystalline thermo-plastic PolyEtherimide and the base is made of liquid crystal polymer (LCP).

19. The pluggable optical transceiver of claim 13,
wherein the base provides a guide hole and an opening having a pair of alignment sides, and the coupling block provides a guide pin and a block having a pair of alignment sides, the guide pin being set within the guide hole and the block being set within the opening when the alignment sides of the block come in contact the alignment sides of the opening.

20. The pluggable optical transceiver of claim 13,
wherein the base has a pair of guide pins to be inserted into respective holes provided in the circuit board, the guide pins being arranged beside the LD and the PD and sandwiching the LD and PD.

* * * * *